(12) United States Patent
Pan

(10) Patent No.: US 12,174,598 B1
(45) Date of Patent: Dec. 24, 2024

(54) TIME SERIES BASED MACHINE LEARNING FRAMEWORK FOR HARDWARE EQUIPMENT AND ITS IMPLEMENTATIONS WITH TRANSFORMERS AND ON OPTICAL PROGRAMMING PROCESSORS

(71) Applicant: Jing Pan, San Lorenzo, CA (US)

(72) Inventor: Jing Pan, San Lorenzo, CA (US)

( * ) Notice: Subject to any disclaimer, the term of this patent is extended or adjusted under 35 U.S.C. 154(b) by 0 days.

(21) Appl. No.: 18/440,875

(22) Filed: Feb. 13, 2024

(51) Int. Cl.
  *G05B 13/04*  (2006.01)
  *G05B 13/02*  (2006.01)

(52) U.S. Cl.
  CPC ....... *G05B 13/042* (2013.01); *G05B 13/0265* (2013.01); *G05B 13/048* (2013.01)

(58) Field of Classification Search
  CPC . G05B 13/042; G05B 13/0265; G05B 13/048
  See application file for complete search history.

(56) References Cited

U.S. PATENT DOCUMENTS

| | | | | |
|---|---|---|---|---|
| 2011/0061015 | A1* | 3/2011 | Drees | H02J 13/00016 |
| | | | | 700/275 |
| 2016/0042541 | A1* | 2/2016 | Nixon | G05B 23/0216 |
| | | | | 345/440 |
| 2017/0308802 | A1* | 10/2017 | Ramsøy | G06N 20/00 |
| 2021/0190354 | A1* | 6/2021 | Llopis | F24F 11/49 |
| 2022/0034543 | A1* | 2/2022 | Alanqar | G05B 13/044 |
| 2023/0315032 | A1* | 10/2023 | Samy | G05B 15/02 |
| | | | | 700/275 |
| 2024/0035695 | A1* | 2/2024 | Mohammad | F24F 11/89 |

OTHER PUBLICATIONS

Wibbeke, J., Alves, D. & Rohjans, S. Estimating time-delayed variables using transformer-based soft sensors. Energy Inform 6 ( Suppl 1), 16 (2023). (Year: 2023).*
J. Yella et al., "Soft-Sensing ConFormer: A Curriculum Learning-based Convolutional Transformer," 2021 IEEE International Conference on Big Data (Big Data), Orlando, FL, USA, 2021, pp. 1990-1998 (Year: 2021).*
H. Wu, Y. Han, M. Liu and Z. Geng, "Robust Low-Rank Clustering Contrastive Learning Integrating Transformer for Noisy Industrial Soft Sensors," in IEEE Transactions on Instrumentation and Measurement, vol. 72, pp. 1-10, 2023 (Year: 2023).*
Z. Geng, Z. Chen, Q. Meng and Y. Han, "Novel Transformer Based on Gated Convolutional Neural Network for Dynamic Soft Sensor Modeling of Industrial Processes," in IEEE Transactions on Industrial Informatics, vol. 18, No. 3, pp. 1521-1529, Mar. 2022 (Year: 2022).*

\* cited by examiner

*Primary Examiner* — Christopher E. Everett
(74) *Attorney, Agent, or Firm* — Syncoda LLC; Feng Ma

(57) ABSTRACT

A method for controlling hardware includes: obtaining equipment sensor data from a plurality of sensors in a time series; obtaining equipment optimization goal data from a plurality of optimization goals in a time series; obtaining historical data on equipment abnormal events and intervention events; obtaining static equipment input parameters; applying at least one time series model to the equipment sensor and optimization data, the historical event data, and the static equipment input parameters, to obtain predicted equipment sensor data; optimizing and controlling hardware operation based on the obtained predicted equipment sensor data; and providing predicted actions for rare event intervention based on the obtained predicted equipment sensor data.

20 Claims, 12 Drawing Sheets

| Survival Classifier for a Rare Event k=0 | | | | | | | |
|---|---|---|---|---|---|---|---|
| Equipment ID | | Input | | | Target | | Note |
| | Time Step | $x_{l\text{-}t,l=...}$ | $y_{si\text{-}t,i=...}$ | $x_{m,m=...}$ | $y_{ek\text{-}t, k=0}$ | Value | |
| 1 | t=0 | $x_{l\text{-}t,l=...,t=0}$ | $y_{si\text{-}t,i=...,t=0}$ | $x_{m,m=...}$ | $y_{ek\text{-}t, k=0,t=1}$ | 1 | |
| 2 | t=0 | $x_{l\text{-}t,l=...,t=0}$ | $y_{si\text{-}t,i=...,t=0}$ | $x_{m,m=...}$ | $y_{ek\text{-}t, k=0,t=1}$ | 1 | |
| 3 | t=0 | $x_{l\text{-}t,l=...,t=0}$ | $y_{si\text{-}t,i=...,t=0}$ | $x_{m,m=...}$ | $y_{ek\text{-}t, k=0,t=1}$ | 1 | |
| 4 | t=0 | $x_{l\text{-}t,l=...,t=0}$ | $y_{si\text{-}t,i=...,t=0}$ | $x_{m,m=...}$ | $y_{ek\text{-}t, k=0,t=1}$ | 0 | remove next |
| 1 | t=1 | $x_{l\text{-}t,l=...,t=1}$ | $y_{si\text{-}t,i=...,t=1}$ | $x_{m,m=...}$ | $y_{ek\text{-}t, k=0,t=2}$ | 1 | |
| 2 | t=1 | $x_{l\text{-}t,l=...,t=1}$ | $y_{si\text{-}t,i=...,t=1}$ | $x_{m,m=...}$ | $y_{ek\text{-}t, k=0,t=2}$ | 1 | |
| 3 | t=1 | $x_{l\text{-}t,l=...,t=1}$ | $y_{si\text{-}t,i=...,t=1}$ | $x_{m,m=...}$ | $y_{ek\text{-}t, k=0,t=2}$ | 1 | |
| | ... | | | | | | |

FIG. 5

TIME SERIES BASED MACHINE LEARNING FRAMEWORK FOR HARDWARE EQUIPMENT AND ITS IMPLEMENTATIONS WITH TRANSFORMERS AND ON OPTICAL PROGRAMMING PROCESSORS

BACKGROUND

Hardware equipment such as assembly lines in manufacturing, electric power systems, building heating, ventilation and air conditioning (HVAC) is typically controlled by computer processors running program, with feedback of data from sensors distributed in the hardware equipment system.

SUMMARY

A method for controlling hardware includes: obtaining equipment sensor data from a plurality of sensors in a time series; obtaining equipment optimization goal data from a plurality of optimization goals in a time series; and obtaining historical data on equipment abnormal events and intervention events.

In some embodiments, the first and second time series can be combined into at least one multi target time series. In some other embodiments, the first and second time series are different time series.

In some embodiments, the method further includes: obtaining static equipment input parameters; applying a time series model to the equipment sensor data, the historical data, and the static equipment input parameters, to obtain predicted equipment sensor data in the time series; and in some embodiment, optimizing the manufacturing based on the predicted equipment optimization goal data; and in other embodiment ensuring hardware equipment operates normally based on predicted rare event data; and providing predicted actions for rare event intervention based on action recommendation data.

In some embodiments, the method further includes: iterating at least once between said obtaining historical data on equipment abnormal events and intervention events, said obtaining static equipment input parameters, and said applying the time series model to the equipment sensor data, the historical data, and the static equipment input parameters, to obtain the predicted equipment sensor data, the optimization goal values, and the predicted rare events; and providing the predicted actions and the evaluated actions based on results from said iterating.

In some embodiments, the providing includes displaying the results on a display screen or phone alert to a user.

In some embodiments, the providing comprises sending a control signal based on the results to a control circuit for controlling the hardware to realize manufacturing optimizing.

In some embodiments, the time series model includes a transformer model, i.e., the foundation model.

In some embodiments, the method further includes outputting a plurality of y variables from the time series model, including equipment sensor data $y\_(si-t)$, from i-th sensor data as a function of time t. Optionally, the sensor data $y\_(si-t)$ includes temperature data measured at specified locations. Optionally, the equipment sensor data $y\_(si-t)$ includes electric motors' amplitude, voltage, current, frequency, force, etc.

In some embodiments, the method further includes outputting a plurality of y variables from the time series model, including equipment optimization goal data $y\_(oj-t)$, from j-th optimization goal data as a function of time t.

In some embodiments, the equipment optimization data $y\_(oj-t)$ includes electric motors' energy output, power, torque (sometimes can also be measured as $y\_(si-t)$), energy efficiency, etc.

In some embodiments, the machine learning architecture at least stack two layers of models on top of the input time series data.

Optionally, the machine learning architecture stacks three layers of models on top of the input time series data.

Optionally, the machine learning service is based on at least two layers of model architecture.

Optionally, the machine learning service is based on three layers of model architecture.

In some embodiments, a method is provided to generate target value sequence beyond one time stamp ahead, and use this generated target value sequence for models in downstream layers as input when real data is not available, wherein a rare event model predicts rare events far into the future because the previous layers are capable to predict sensory data far into future and choice of survival classifier enables manipulation of rare event data by rows to overcome the lesser rare event label in a supervised learning concept.

In some embodiments, a rare event model based on transformer is capable to forecast rare event.

Optionally, a rare event model based on transformer is capable to forecast rare event when there is no previous rare event.

Optionally, a rare event model based on transformer is capable to forecast rare event when there is only one previous rare event.

Optionally, a rare event model based on transformer is capable to forecast rare event when there are several rare events.

In some embodiments, an action recommendation model can output predicted actions far into the future because the previous layers are capable to predict sensory data far into future.

Optionally, the action recommendation model can output predicted actions far into the future with supervised learning methods from the recommendation system.

Optionally, the action recommendation model can output predicted actions far into the future with multi class binary classification models.

Optionally, the action recommendation model can output predicted actions far into the future with the graph link formation prediction approach.

In some embodiments, the action recommendation model can output predicted actions far into the future from the transformer model.

Optionally, the action recommendation model can output predicted actions far into the future from the transformer model with the multi modal approach.

Optionally, the action recommendation model can output predicted actions far into the future from the transformer model with an action evaluation approach.

In some embodiments, the method for controlling hardware provides hardware equipment parameter optimization based on time series models, wherein the optimization model predicts optimization goal values, the hardware parameters in the input of this model that yields the best optimization goal value is the best hardware parameter set.

Optionally, more efficient parameter search methods for hardware equipment parameters are machine learning based search methods.

Optionally, more efficient parameter search methods for hardware equipment parameters are machine learning based search methods such as random and SAMBO.

In some embodiments, hardware equipment parameter optimization is based on transformer.

In some embodiments, hardware equipment control based on time series machine learning models or transformer, and a novel numerical approach without explicit formula are provided.

In some embodiments, a large transformer model (a foundation model) is provided, which crystalizes a lot of hardware equipment data from various application scenarios and types of equipment and various input and output data types and sources, serves as a foundation model similar to that of Large Language Model (LLM), to generate sequences of all kinds of sensory, optimization, rare event, action sequence, sequence prediction, task specific prediction, fine tuning, transfer learning, embedding, retrieval, and so on.

In some embodiments, the method for controlling hardware provides an EquiFormer system design based on the concept of connected equipment, wherein the Equiformer system is applied to the next generation optical programming processor (OPP); wherein the next generation optical programming processor design is based on Internet of Things (IoT) component assuming internet connections; wherein the design solution for the next generation optical programming processor to be integrated into a larger system to control equipment in a far space is based on photon entanglement assuming no internet connections; wherein the next generation optical programming processor's control on photon entanglement is from earth to far space.

In another aspect, a non-transitory computer-readable medium is provided, having instructions stored thereon for execution by one or more processing circuits to implement operations of the methods for controlling hardware.

In yet another aspect, a manufacturing system is provided, including one or more processing circuits, a manufacturing/assembly line, sensors, controllers, and the non-transitory computer-readable medium for optimization of the manufacturing process.

BRIEF DESCRIPTION OF THE DRAWINGS

FIG. 5 shows a survival classifier based rare event model.

DETAILED DESCRIPTION

Figure 1:
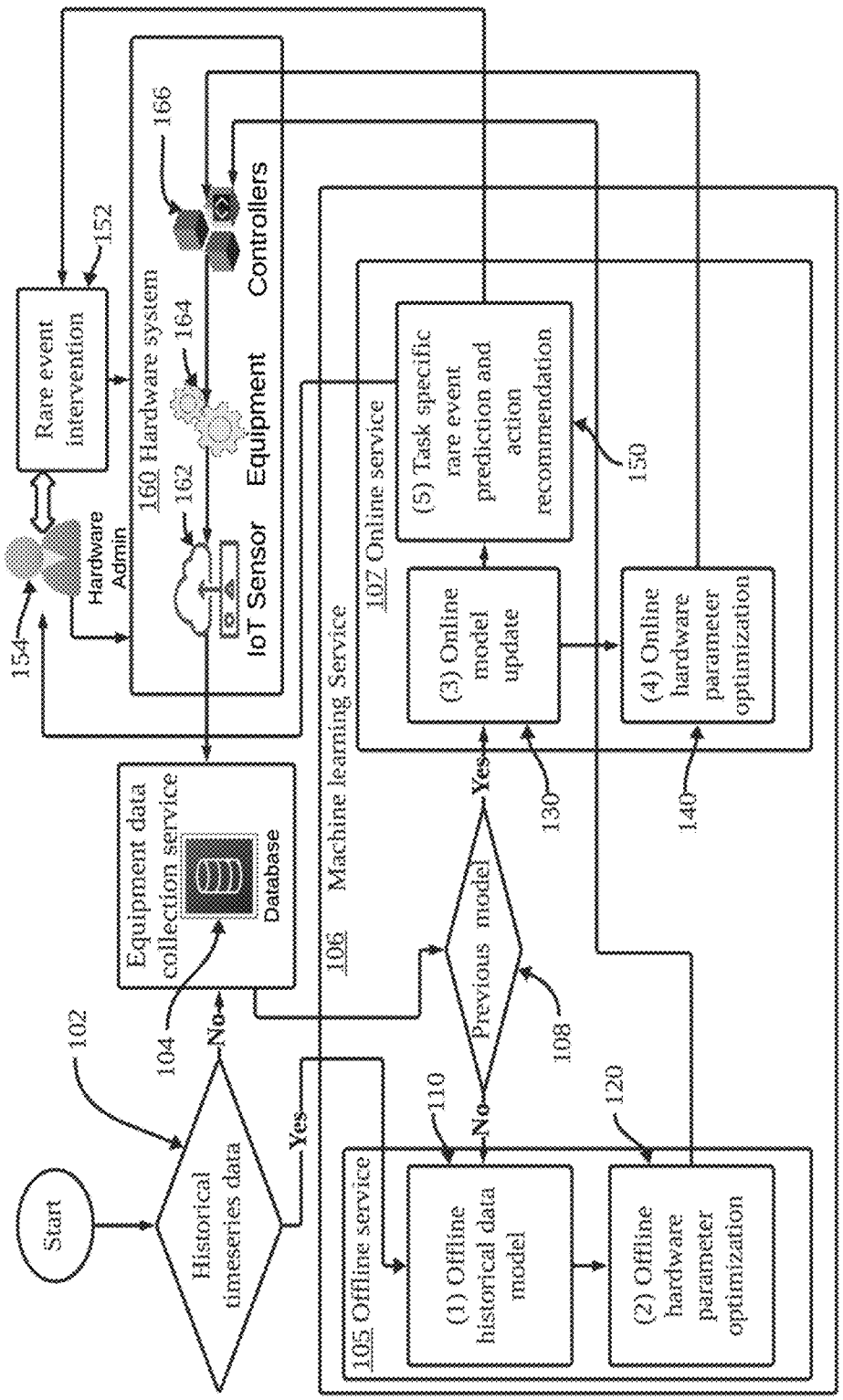
FIG. 1 shows an EquiFormer overall system design with machine learning service.

Hardware equipment operate in a fashion that they have a large quantities of fast changing time series data from different sensors in almost real time, have relatively less fast paced changing parameters pre-set/tuned for equipment, and have multiple non-mutually exclusive events such as maintenance, failures, adjustments, and production, and multiple optimization goals such as best energy efficiency, maximum product output, and less failures. The complexity of the hardware system makes it hard to be optimized with traditional machine learning methods.

A supervised learning modeling technique typically needs labels. In time series problem, it needs dependent variable(s) that change(s) with time. However, other than the sensor data which is also the modeling input, usually the optimization goal for manufacturing, such as the production output rate etc. does not change that much in real data. For events such as maintenance and failures, they are extremely rare in real data. That is why it is generally difficult to apply machine learning techniques to model hardware system in manufacturing process, power system, HVAC system, etc.

Artificial intelligence (AI) has made progresses in natural language processing (NLP) and imaging/video processing. Hardware and manufacturing industry, however, has yet seen major changes by AI. The reasons can include: (1) events in manufacturing industry occur rarely, which is difficult for supervised learning technique to use those rare events as labels; and (2) it is difficult to model large quantities of time series data from equipment sensors with traditional time series models with limited variability in both dependent and input variables, long sequences in sensory data, multiple dependent variables, multiple inter-correlated modeling goals, collinearity of input variables, lack of integrated data source across the industry (as compared to internet data on the cloud) due to lack of secure hardware infrastructure with internet of things (IoT) and integration with cloud data platform, etc.

In some implementations, traditional time series techniques can be employed to model manufacturing equipment data, for example, based on regression-based time series (Mendenhall, Sincich et al. 2003). This regression approach usually models one time series sequence at a time. Manufacturing equipment, however, usually have a large number of sensors for even one equipment/processors, and one senor might also sense more than one dimension of data. People would want to know all of the future sensory values, which requires modeling many time series sequences, and dealing with long sequences in sensory data, multiple dependent variables, multiple inter-correlated modeling goals, collinearity of input variables.

Another approach can be a tree-based model (Liukis 2020). Usually, it also only models one time series sequence at a time. It's best suitable, among traditional machine learning methods, to model multiple mutually exclusive categorical classifications as dependent variables with time component in the modeling input. In a manufacturing process, many of the future target values of interest are either correlated, or categorical but not mutually exclusive. For example, a hardware component of an equipment's temperature when in use might be correlated with the volume of the component. In another example, a component of an equipment in use can have deficiency in one area as the component ages, which also increase its chance of having a deficiency in another area. It could potentially model continuous dependent variables but it lacks the capacity to modeling complex correlations and variability among both dependent and independent variables.

Deep learning with its unique ability to predict non-mutually exclusive multi label output, with universal approximation, meaning any relation among dependent and independent variables, is the next advance for modeling manufacturing process. Transformer is a type of deep learning model that models long sequences (Vaswani, Shazeer et al. 2017). It has traditionally been applied to natural language processing and imaging processing with a lot of breakthroughs. For example, a first step of a large language model is a pre-trained transformer model on language corpse. However, machine learning modeling techniques have been difficult to be applied to the hardware system in manufacturing process, etc. for (1) lack of a large quantity of integrated data source and IoT/cloud system design on how to achieve this goal; (2) lack of hardware design to achieve such system design in (1), especially when there is a long distance from sensor to data center or no internet is available, etc.; (2) lack of hardware system's specific time series coding for sequences in the modeling; (3) lack of design of model stacking/model architecture with multiple goals (4) non-existence of transformer based task specific machine learning solutions for hardware system's specific application scenarios when there are plenty for NLP and imaging. In the hardware optimization part of the goal, traditional control theory relies on explicitly written out mathematical formulas to achieve optimal parameters. Either the mathematical formulas deviate from the reality or the real data is hard to be approximated with explicit formulas. It is hard to apply existing control theory to those parameters to correct deviation of the parameter values even if the optimal parameters are known to machine learning optimization models.

Section 2. The following paragraphs describes a system framework according to some implementations of this disclosure.

Section 2.1. System Design

The machine learning service part can include: (1) a pre-trained machine learning model of historical time series data, (2) a simulation-based approach from pre-trained model to update parameters for optimization goal, (3) a continuous online model update, (4) continuous parameter optimization based on real-time equipment data, and (5) multi-modal model-based events prediction and action evocation. In addition to the machine learning service, hardware system, and software service essential for the machine learning service to function are also needed.

For example, an air conditioner for cooling may have the following non-time-stamped input: designed AC voltage intake, designed AC amperage intake, product dimensions, designed power consumption, weight; time stamped sensory data: room temperature, room humidity, room $O_2$ level, room $CO_2$ level, room air pressure, outside temperature, real-time AC power, real-time motor frequency, real-time motor torque, real-time motor temperature, indoor airflow rate, etc.; optimization goal: SEER (Seasonal energy efficiency ratio), cooling capacity measured in British Thermal Units (BTUs); and example of abnormal events: motor failure, electric circuit failure.

Section 2.2. Machine Learning Design with Time Series

In the above system design, the machine learning service is backed by layers of machine learning models. To begin with, parts (1) and (3) will have very similar machine learning model architecture based on time series. That is "layer one" of machine learning architecture according to some embodiments of the present disclosure.

First, time t can be defined as a series of temporal points from 0 to n.

Second, multiple y variables can be designated to represent the output/target of the models. (1) In some embodiments, equipment sensor data $y\_(si-t)$ can be obtained, in which i is the i-th sensor data that is from equipment and changes with time t. An example can be the temperature T at a particular spatial location at a particular time t on the equipment. (2) In some embodiments, continuous equipment optimization goals $y\_(oj-t)$ can be obtained, in which j is the j-th equipment optimization goal's value, and changes with time t. An example can be the manufacturing output rate at a particular time. (3) In some embodiments, binary equipment rare event $y\_(ek-t)$ can be obtained, in which k is the k-th equipment-related rare event and it can only take the value of 0 indicating that the event does not happen, or the value of 1 indicating that the event happens.

In real data, occurrences of 1 can be very rare, such as in the event of a hardware failure, a hardware alarm, etc.

Figure 2:
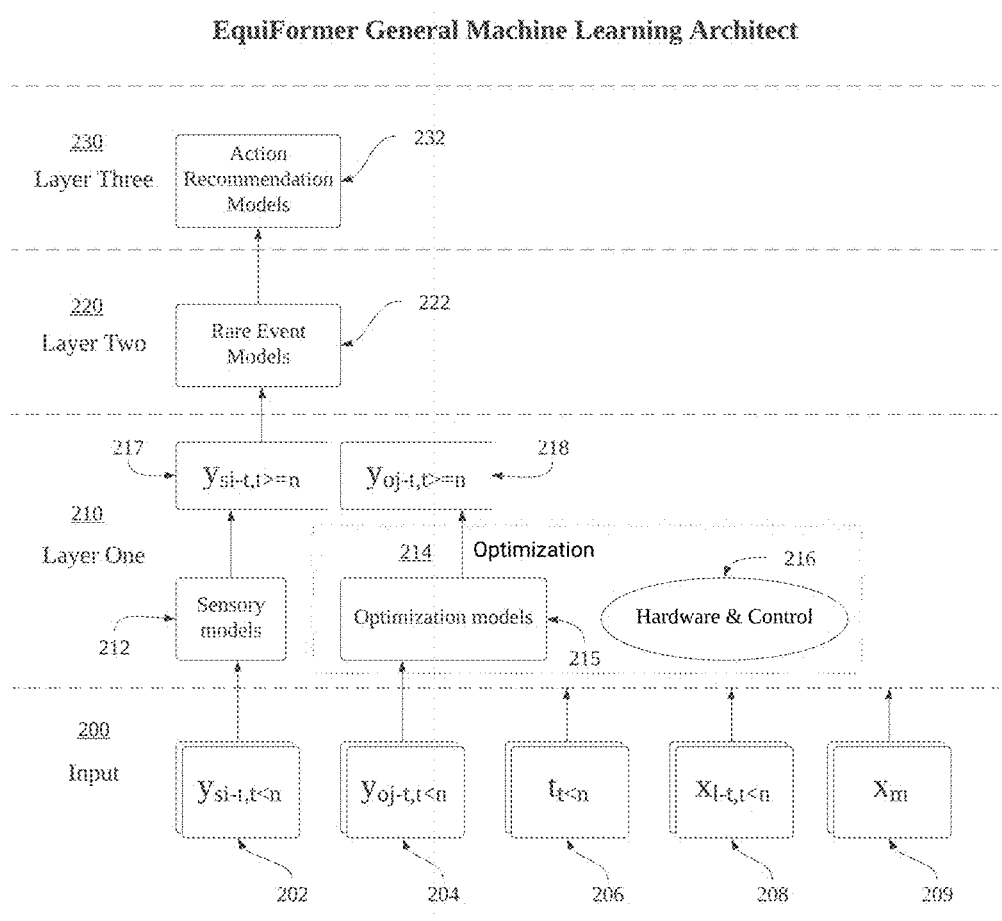
FIG. 2 shows an EquiFormer general machine learning architecture.

Third, the model can be fed with input data (200). FIG. 2 illustrate the overall machine learning architecture from input data to model layer stacking. (1) In a first example, time step itself $t\_(t<n)$ 206, can be input. (2) Other input variables such as sensory data $y\_(si-t, t<n)$ 202 and optimization goal $y\_(oj-t, tn)$ 204, can also be included. Time series' characteristics can be that for y variable at t=n, all of its previous values at tn can be used as input. (3) In a third example, time-based other input variables $x\_(l-t, t<n)$ 208 can be provided. Examples include the temperatures from weather forecast service. (3) In a third example, none-time-based other input variables $x\_m$ 209 can be provided. Examples include the equipment's design specifications, such as designed coil diameter, equipment designed voltage intake, etc. Input variables in the $x\_m$ group do not change with time, and not all time series models require every input variable to change with time, but are generally kept in the model's general form. Input variables in the $x\_m$ group differ when there are many different similar hardware machines being modeled in one machine learning time series model. Input variables in the $x\_m$ group are extremely useful when applying transformer modeling technique to a large amount of similar but different hardware machines like large language corpses providing invaluable baseline information.

FIG. 1 illustrates an EquiFormer overall system design with machine learning service. In step 102, it is first determined whether historical time series data are available for a specific manufacturing process. If they are not available, then equipment data collection service can be invoked based on a database 104. Data from database can be fed to machine learning service 106, specifically to a determining step 108 on whether previous model exists. If not, then offline historical data model 110 can be invoked, to provide offline hardware parameter optimization 120. If previous model 108 does exist, then online model update 130 can be invoked, which facilitates online hardware parameter optimization 140, as well as task-specific rare event prediction and action recommendation 150. Such recommendation can be displayed on a display screen 152, or transmitted via other audio/visual/haptic signals, as a rare event alert, to inform a hardware administrator/user/operator 154. The operator 154 can intervene directly, or through a controller/processor associated with display screen 152, hardware system 160. Internet of Things (IoT) sensors 162 of hardware system 160 can sense data from equipment 164, and feed the sensed data to database 104. Equipment 164 can be controlled by controllers 166, based on offline hardware parameter optimization 120 and/or online hardware parameter optimization 140.

EquiFormer's machine learning architecture serves as underlying architecture of the system (FIG. 1) and stacks three layers of models. The overall machine learning architecture is depicted in FIG. 2. In layer one 210, there are two categories of models, sensory models 212 and optimization models 215 to model time series data whose output are predicted sensory values 217 and optimization values 218, respectively, and an optimization strategy 214 build on top of optimization models 215 and hardware control strategy 216 as a sub-component of optimization strategy. In layer two 220, there are rare event models 222. In layer three 230, there are action recommendation models 232. Each upper layer is built with input from previous layer(s)'s output. Sensory 212 and optimization 214 models in FIG. 2 back up 110 and 130 in FIG. 1. Hardware optimization 214 and control 216 in FIG. 2 backs up 120 and 140 in FIG. 2. Rare event 222 in FIG. 2 and action recommendation models 232 in FIG. 2 back up 150 in FIG. 1. However, although this patent organizes the model stacking into three layers, the actual organization of model stacking remain flexible.

However, such complex machine learning design such as EquiFormer may require multiple layers of model stacking, which enables flexibility of predicting into future and separation or unification of multiple target variables into multiple models or one model.

Using industrial robot as an example, the measured non-time stamped specifications may include designed voltage and amperage intake, arm reach and payload capacity, degrees of freedom (joint flexibility), physical dimensions and weight, and type of controller and programming interface. The time-Stamped Sensory Data may include joint position and speed, load on each joint or end effector, motor temperatures, energy consumption in real-time, environmental temperature and humidity (if applicable), and vibration and acoustic signals. The optimization goals may include operational efficiency (speed and accuracy of movement), energy efficiency, minimizing wear and tear, and maximizing uptime and reliability. The abnormal events may include mechanical joint failures, overheating of motors or electronics, calibration drift, unexpected collisions or obstructions, and software or control system errors.

Section 2.3. Time Series Models for Sensory Data and Hardware Optimization

Some embodiments of the present disclosure model the following time series relationships. (1) The machine learning model uses previous time's data $t<n$, with input of time $t\_(t<n)$, all of $x\_(l-t,t<n)$, all of $y\_(si-t,t<n)$ and all of $x\_m$, and predicts the ith sensory data $y\_(si-t,t=n)$, at time $t=n$. It is called the sensory model. (2) The machine learning model uses previous time's data $t<n$, with input of time $t\_(t<n)$, all of $x\_(l-t,t<n)$, all of $y\_(si-t,t<n)$, additionally all of $y\_(oj-t,t<n)$, and all of $x\_m$, and predicts the jth optimization goal $y\_(oj-t,t=n)$ at time t. It is called the optimization model.

In the sensory model, there are i output variables at time $t=n$. In some embodiments of the present disclosure, the choice of time series model is flexible. Various embodiments of the present disclosure can have different types of time series model to represent those relationship.

In addition, some embodiments of the present disclosure can choose times series models that have only one output variable per model; as such, i models are built. Alternatively, some embodiments of the present disclosure can skip i models, because one deep learning model can have i multiple head (i output variables). In some embodiments of the present disclosure, the system is designed without picking the specific model. So does the optimization model. For example, it is not necessarily to have j models, as long as the modeling technique predict j output variables.

Once sensory and optimization models are constructed, whether the choice of model technique is traditional time series techniques or new deep learning technique such as a transformer, the models can generate not only the target value at time $t=n$, but also at time $t=n+1$, $n+2$, ..., $n+time\_delta$, for both $y\_(si-t)$ and $y\_(oj-t)$. This is based on traditional or deep-learning-based generative AI.

Although other time series techniques are also capable of generating such sequence, they have not been widely applied to manufacturing equipment data, possibly because (1) such none-deep learning none-transformer generated sequence deviates from real data in manufacturing equipment which is in term due to (2) lack of capacity to model long sequence of data in the input and (3) incapacity of modeling collinearity in the multiple input and inter-correlation of multiple output.

For example, in case of abnormality detection, traditional statistical methods such as z-score only need 1 data point to test if that data point is deviant from population metric such as mean. Those skilled in the art typically feel if they have one target data point at time t, it is sufficient for them to make decisions such as sending alert.

For optimization goals, persons skilled in the art tend not to use sequence modeling techniques but tend to compress the time dimension to simplify model process.

In various embodiments of the present disclosure, traditional time series technique can be employed to generate sequence of manufacturing equipment data, and subsequently the generated sequence can be used as input for rare event models and action recommendation models for prediction. The time series sequence modeling, however, can be improved with novel transformer-based modeling techniques.

Figure 3:
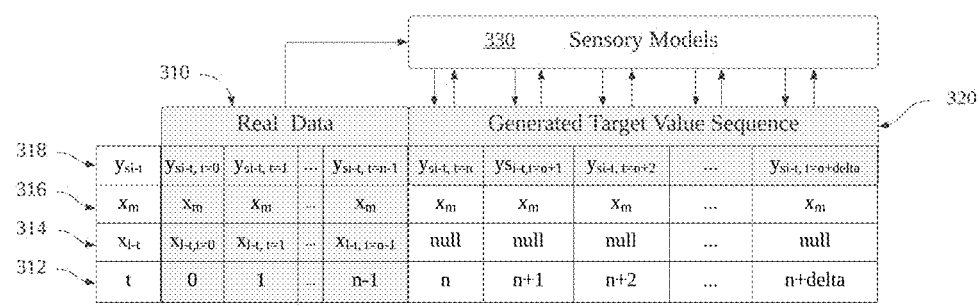
FIG. 3 shows EquiFormer sensory models generating predicted target value sequence.

The method to generate target value at time beyond $t=n$, for example, at time $t=n-1$ is to recursively feed the next predicted target value to the model as shown in FIG. 3. FIG. 3 describes this generated sequence graphically in the example of sensory models. For example, at time $t=n-1$, persons skilled in the art get predicted value of $y\_(si-t,t=n)$ at time $t=n$ by feeding real data 310 into the sensory models 330. In the next iteration, the predicted $y\_(si-t,t=n)$ is treated as if it were actual sensory data at time $t=n$, and feed into the sensory models to get the predicted value of $y\_(si-t,t=n+1)$, for time $t=n+1$, even though it still at time $t=n-1$, and those skilled in the art do not know the real value of $y\_(si-t,t=n)$ yet. If one of $x\_(l-t,t=n)$ at time n is unknown when the actual time is n-1, those skilled in the art can use their best guesses, for example, if this is foretasted temperature from weather service, one can use the next however many day's forecast, or just treat it as a missing data point in traditional machine learning, and fill with historical values such as mean, max, minimum, etc. By keeping repeating this process for the next predicted time step, persons skilled in the art will get a sequence of the predicted value of $y\_(si-t,t=n)$, $y\_(si-t,t=n+1)$, $y\_(si-t,t=n+2)$, and so on. This sequence 320 is a machine learning model generated sequence of sensory values. The process is similar to that for optimization models to generate optimization goal sequence: just need to add sensory model predicted values of $y\_(si-t,t>=n)$ as input to the optimization models.

In modern machine learning service practice, persons skilled in the art or automated processes will have to collect initial data for initial model training, which is the 110 in FIG. 1. As time goes by, more data will be collected and models will be updated, which is the 130 in FIG. 1. That's why the same sensory and optimization models are in two places in FIG. 1. The online model update part (130 in FIG. 1) is widely used in many online internet services such as online advertising, video site, social media and eCommerce. However, the online model update part is actually rare in the manufacturing industry. Before the internet of things happen in the industry, it is relatively hard to control a hardware from remotely online (cloud). Even after the internet of things appears, hardware control from remotely online is mostly rule based or human manual action. Various innovative aspects of some embodiments of the present disclosure compared with other approaches will be further described section 2.8.

Section 2.4. Service Layers

Figure 4:
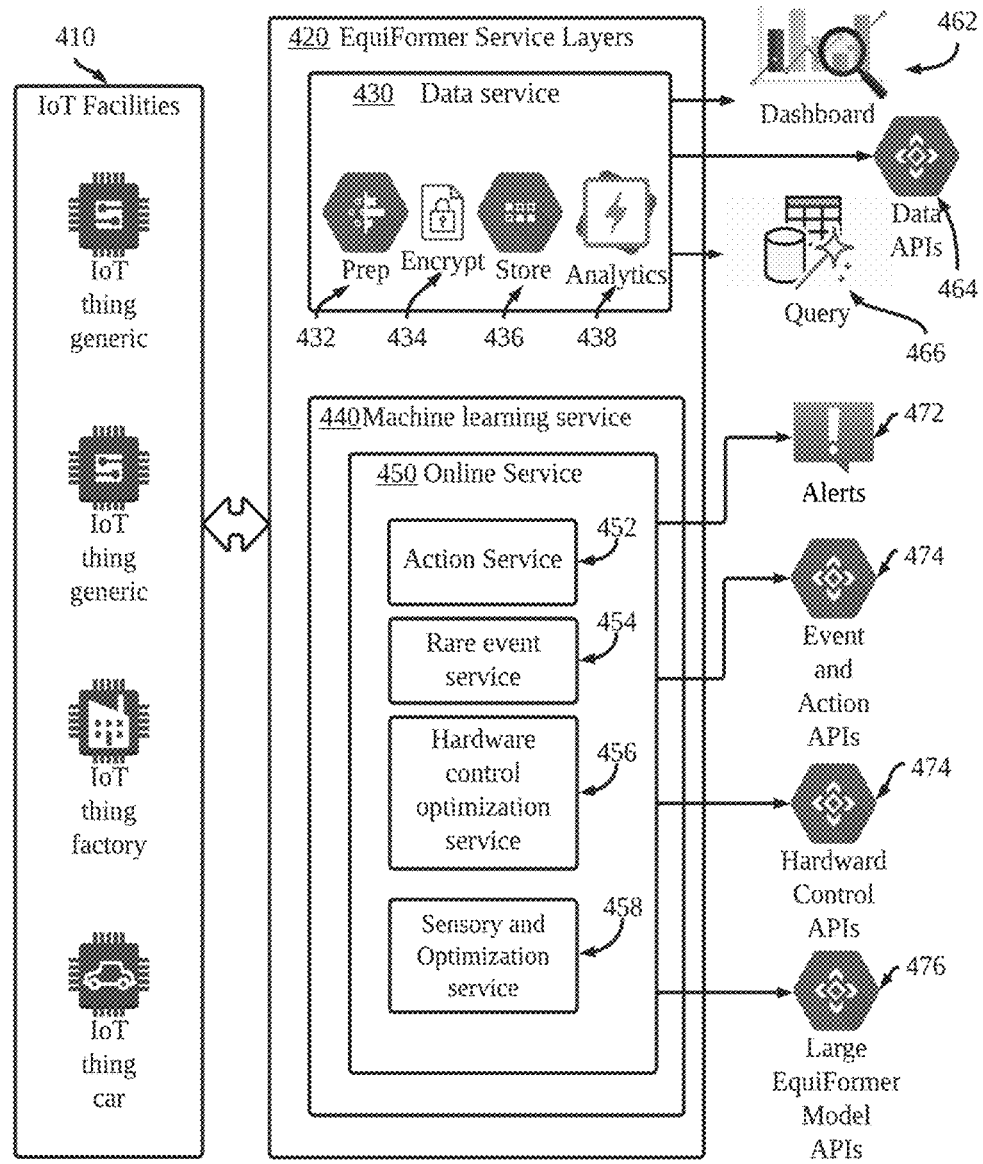
FIG. 4 shows an EquiFormer IoT and cloud machine learning services.

In order to make use of the EquiFormer system in FIG. 1, the online service layers depicted in FIG. 4 can be the application layer of EquiFormer system. The description of service layers is described after model layer one in Section 2.4. for ease of the audience to understand.

The service layers 420 utilize IoT facilities 410 instead of isolated equipment data collection as explained in Section 2.4., a large number of different hardware equipment provide more information in the x_m 209 group of inputs, and models of relationship between input and output from a large number of equipment provide baseline or large model information for specific piece of equipment to use via the service layers. It uses a lot of equipment connected through IoT to a larger model (EquiFormer), and use the large model to generate content (sensory and minimization sequence) for specific input (specific piece of equipment). The source of IoT equipment and facilities can be diverse, from manufacturing facilities, power systems, traffic systems, cars, building surveillance system, security system to anything. FIG. 4 only illustrates some examples of IoT equipment. However, this is not limiting of the present disclosure. The kind of sensory information and sensors can also be very diverse and for simplicity not depicted in FIG. 4.

The data service 430 first serves as a key component to provides data for modeling service. It prepares data 432, encrypts data 434 as security is always extremely important, stores data 436, and analyzes data 438, within itself. The sub components of the data service 430 are not limited to the said examples (432, 434, 436, 438). Appropriate data related sub components can also be included. It also provides its own utilities through including but not limited to dashboards 462, APIs 464, queries 466, . . . , and so on.

The machine learning service 440 in FIG. 4 corresponding to 106 in FIG. 1, especially the online machine learning service 450 in FIG. 4 corresponding to 107 in FIG. 1, provides utilities with its sub services. Action service 452 and rare event service 454 send alerts and provides APIs. Some examples of the API usage could be but not limited to: (a) to control hardware equipment in case of predicted rare event and recommendation (b) to provide feedback and data back to machine learning and data services. Hardware control optimization service 456 not only figures out and continuously updates what best hardware parameters are, but also more importantly when hardware parameters are deviated from the optimal parameters, it calculates what the correction should be and provides APIs to continuously control the hardware to minimize the deviation. Sensory and optimization service 458 in FIG. 4 are based on sequence modeling in 212 and 215 in FIG. 2. It may not be obvious that they need to provide utility service on their own other than provide predicted data for downstream services (meaning 456, 454, 452). But they do. They can provide APIs, called Large EquiFormer Model APIs 476, for looking into the model, embeddings, model parameters, model weights, embedding comparisons, model update and fine tuning, etc. A description of embedding is further provided below.

A common practice in modern software architecture is modular and based on micro service. Only limited examples of APIs and services are depicted in FIG. 4. In reality, persons skilled in the art can always expand APIs, adding more services when appropriate. Also only limited sub components of services are depicted in FIG. 4. In reality, persons skilled in the art can always expand, separate, add more sub components when appropriate.

Section 2.5. Hardware Parameter Optimization

In the terminology of machine learning, parameter optimization means searching for machine learning model's combination of parameters so that the predicted target values best match the real target values. This section is not about machine learning parameter optimization. In hardware, parameter optimization means that searching for values of specific settings of hardware, so that it maximizes the optimization goals. This section is about the innovation of using machine learning models to virtually find the optimal hardware parameters.

This is how the optimization models can be used to find the optimal hardware parameters. In the optimization models according to some embodiments of the present disclosure, the settings of hardware are not parameters of models, but input of models. They can be in x_m, such as the designed number of loops in coil, or sometimes in $x\_(l-t)$, such as the temperature of a specific part of the hardware that can be set and changed at different time.

Once an optimization models is provided, for each goal, in a simulated environment, one can virtually change the values of parameter setting related values of x_m and $x\_(l-t)$ in a simulated environment, with real, historical, simulated or predicted values of t, $x\_(l-t,t<n)$, $y\_(si-t,t<n)$, and $y\_(oj-t,t<n)$. Then it will give predicted value sequence of $y\_(oj-t,t>=n)$. It is then possible to see which combinations of parameter setting related x_m and $x\_(l-t)$ values gives the most desirable $y\_(oj-t,t>=n)$. Usually the application is to maximize the value of the mean of values of $y\_(oj-t,t>=n)$.

The strategy to vary x_m and $x\_(l-t)$ in their own space in the parameter optimization process is called parameter search strategy. In some embodiments of the present disclosure, the parameter search strategy is flexible, and it should be emphasized that parameter search strategies not commonly used in hardware/manufacturing industry but commonly used in machine learning practice can also be applied to hardware/equipment optimization under a framework of some embodiments of the present disclosure. There are three common machine learning parameter search techniques that can be applied to some embodiments of the present disclosure.

Firstly, it can be grid search, which is what traditionally equipment manufacturers do in their physical lab setting, usually before the equipment is released to real world production.

Various embodiments of the present disclosure provide the following innovative aspects. (1) It moves this physical lab testing process to virtual machine learning based simulation, in theory saving time and resources. Traditional hardware engineers tend to do the optimization in the physical lab. They actually change the design specifics or settings of equipment and measure the real optimization goal values. After they exhausted their search space (i.e., all possible combination of hardware parameter values they can afford to set and test), the combination of x_m and x_(l−t) that produce the best y_(oj−t,t>=n) is chosen. (2) Some embodiments of the present disclosure use time series models for predicted value of optimization goal. Traditional hardware engineers tend generalize their data with explicitly parameterized mathematical formula, not machine learning models. Then based on their generalized mathematical formula, they expand their search space. They usually physically test in a controlled lab environment with fixed conditions such as control intervals of temperatures, etc., and try to find optimal settings for an optimization goal, ignoring that running equipment in the industry are continuously facing changing conditions. That's why in the lab equipment have certain values for their optimization goal, but usually in industrial usage in real environment, they will have varied performance with regard to that optimization goal. Various embodiments of the present disclosure take into the account of changing y_(si−t) values when predicting optimization goal values y_(oj−t). Some of machine learning technique, such as deep learning, can achieve universal approximation of relationship between input and target values, which is hard to write explicit parameterized mathematical formula. Some embodiments of the present disclosure apply machine learning techniques, agnostic of specific choice of modeling technique, to the hardware equipment optimization process.

The second strategy is random search. The combination of search space when one has more than one parameter to search increases rapidly following the formula of combination. When it is desired to reduce the combination of parameter values in x_m and x_(l−t), which are used to get predicted or real optimization goal value, some embodiments of the present disclosure suggest (pseudo) random generation of combinations of parameter values. This random search strategy is common for machine learning optimization. Various embodiments of the present disclosure innovatively apply random search for hardware parameter optimization.

The third search strategy is sequential model-based optimization (SMBO) approach, which improves over random search. Sequential Model-Based Optimization (SMBO) is used for optimizing expensive-to-evaluate functions. It's particularly useful when each function evaluation takes a large amount of time or resources, such as tuning hyperparameters of a machine learning model. SMBO is very powerful when evaluations of the functions are very expensive, such as training a large machine learning model. It is widely used in hyperparameter optimization for machine learning models.

Instead of randomly picking the next combinations after the seeding combination, one picks the next combination inferred from machine learning models. This strategy is adopted in some embodiments of the present disclosure because if the optimization model is based on deep learning, even virtual evaluation is computationally expensive. SMBO based search strategy is commonly used in machine learning parameter optimization and again not in hardware parameter optimization.

Tree-structured Parzen Estimator (TPE), belonging to the family of Sequential Model-Based Optimization (SMBO) methods, is used in Optuna (Akiba, Sano et al. 2019) and a variation, Adaptive TPE, is used in HyperOpt (Bergstra, Yamins et al. 2013).

The Tree-structured Parzen Estimator (TPE) is an algorithm used for hyperparameter optimization in machine learning. TPE can be more effective than other hyperparameter optimization methods, such as grid search or random search in high-dimensional hyperparameter spaces. TPE can also effectively handles non-uniform and conditional distributions of hyperparameters.

In some embodiments of the present disclosure, Optuna™, which is an open-source hyperparameter optimization framework, can be adopted for machine learning. Optuna™ provides a user-friendly yet powerful way to automatically search for optimal hyperparameters for machine learning models, and can help improving efficiency in finding high-quality solutions within a short time frame.

The term "adaptive" in Adaptive TPE suggests that the algorithm dynamically adjusts its approach as it learns more about the hyperparameter space. As the optimization process progresses, the algorithm becomes better at predicting which hyperparameters are likely to yield better performance, focusing the search in the most promising regions of the hyperparameter space. In HyperOpt library, Adaptive TPE is used to efficiently and effectively find the best hyperparameters for a given machine learning task. It's particularly useful when dealing with high-dimensional spaces and complex objective functions, where traditional methods like grid search become computationally infeasible.

Users dealing with hardware often cannot use libraries HyperOpt or Optuna™ directly on the hardware parameter optimization problem because they are written specifically for optimizing supported machine learning models.

Various embodiments of the present disclosure can, however, apply the process principals of HyperOpt or Optuna™ to hardware parameter search strategy. TPE is a sequential model-based optimization (SMBO) approach. In machine learning hyperparameter tuning, TPE models P (x|y) and P (y) where x represents hyperparameters and y the associated loss, the objective function, and then chooses the x that minimizes the expected value of y. It separates the parameter space into two regions based on the observed values of loss, and then preferentially samples from regions where loss is lower. In some embodiments of the present disclosure, y can be replaced with an objective function y_(oj-t), and x should be replaced with parameter values in x_m and x_(l−t), and depending of the specific jth hardware optimization objective, some embodiments of the present disclosure can aim for maximize or minimize y_(oj−t). The preferentially samples from regions where y_(oj−t) is larger or smaller, depending on the specific optimization goal. Some embodiments of the present disclosure can also use the principles Adaptive TPE to adapt the number of samples balancing exploration and exploitation during optimization. Various embodiments of the present disclosure innovatively apply SMBO to hardware optimization.

Usually, in a traditional manufacturing process, once the optimal set of parameters are found in the laboratory setting, they will be set to the hardware, and will not change. A system design according to some embodiments of the present disclosure has the online service part in FIG. 1. In industrial production in real-time, the online machine learning model have the capacity to suggest new parameter values outside of their respective ranges that have been previously verified in the physical lab, because optimization models are updated online. The newly suggested set of hardware parameters may not be trusted yet to be set back to the hardware immediately. The ranges of parameter values can be set within which are allowed to be updated by online machine learning models in production in the machine learning service in 140 of FIG. 1.

One can also set rules on what ranges of parameter values are not allowed to be directly set back to the hardware, but test the newly suggested parameter values in parallel for physical lab to verify if the suggesting is true. Using this method, the EquiFormer overall system can reduce risk in production as well as accelerate the iterations of product development in the physical lab. Old manufacturing equipment development cycle lacks machine learning suggested parameter and real-time industrial data feedback, and the development flow is almost always from lab to industry, and hard to parallel the process between lab development and industrial use.

Using Chip Manufacturing Equipment (e.g., Photolithography Machine) as an example, the measured non-time stamped specifications may include power requirements (voltage, amperage), dimensions of the machine, wafer size compatibility (e.g., 300 mm wafers), light source type and intensity (for photolithography), resolution and overlay accuracy, throughput (wafers per hour). The time-stamped sensory data may include wafer temperature and humidity, vibration and stability measurements, light intensity and wavelength (for photolithography), real-time power consumption, chamber pressure (for vacuum processes), and positioning accuracy of wafer stage. The optimization goals may include yield (percentage of good chips per wafer), precision and repeatability of patterns, throughput (maximizing the number of wafers processed), minimizing defects and contamination, and energy and resource efficiency. The abnormal/rare events include misalignment or patterning errors, equipment vibrations affecting resolution, contamination of wafers, light source malfunction (in photolithography), and vacuum system failures (in deposition or etching equipment).

Section 2.6. Rare Event Models

An obstacle in the past is that equipment is isolated to each other, so the rare events do not get collected enough for machine learning model to train. In a system design according to some embodiments of the present disclosure, the innovation mainly is in the combined hardware and machine learning infrastructure and use this infrastructure to apply to rare event modeling. For manufacturing equipment, the equipment data collection service and machine learning service can be in the cloud, and a request can be made to IoT infrastructure to send sensor (including failure rare events) into cloud.

More rare event data can therefore be obtained to build model because of the cloud share. After the rare event model is built, the model can be shared on the cloud with other pieces of equipment. As such, even if a specific piece of equipment has never failed (an example of a rare event) in a particular factory, but another similar piece equipment has failed, and the model is trained on the cloud, the rare event model can still be applied to the never failed piece of equipment to predict its future failure. It is like how machine learning model works in cyber security. Even if a new type of attack is not discovered in the US, but as long as it is discovered in somewhere else and the attack model is trained and shared in the cloud, this attack model can predict the attacks in the US. FIG. 4 illustrates the IoT integration to the machine learning system of EquiFormer.

Here is a survival classifier machine learning approach for rare event models (not the transformer approach in Section 3). The term rare that describes events are relative. The target is whether the event $y\_(ek-t, t=n)$ happened at time n, with a value of 1 vs. not happened, with a value of 0. In each time step of a given time period, if a given event does not happen for the most of the time, the event is rare. If the number of rare events in the historical data is an order of magnitude lower than a hundred, new methods to model and predict rare events are described in Section 3. For rare events such as hardware failure that might happen less than often but still happen for an empirically estimated minimum of about more than a hundred times in the shared historical data, traditional machine learning technique can still be used, such as survival classifier models as shown in FIG. 5. For training, the input of the rare event model are sensory input $y\_(si-t, t=n-1)$ and time sensitive non-sensory input $x\_(l-t, t=n-1)$ at a previous time step n-1 and $x\_m$ which varies across equipment, but the survival classifiers need to organize the input and output data their own way. Each row in the data represents a piece of equipment at a specific time step (t from 0 to n), its input variables, and the status of the rare event as target. Once an equipment failed (not survived) at a time step n, it no longer presents in data at time step n+1. Because of this elimination of requirements, every rare event will have its own model, instead of a model with multiple rare event target labels, except new methods described in Section 3. In order to deal with the imbalanced target data, one just need to carefully sample and weigh data points where rare event happened vs. not happened. Please also note that with the survival classifier machine learning approach, the training data actually takes a sequence of previous time steps across rows, see the Time Step column in FIG. 5. In a specific row, the label in the Target column in FIG. 5 is the immediate next time step of the input time step. Every row at one time step is extremely important for this solution and will be discussed in 0066.

For prediction, if persons skilled in the art want to predict rare events many steps into the future time, actual sensory data used in the training will be replaced with predicted sensory value in the future time steps from the sensory model. Rare event happened rarely. The overall machine learning architecture in FIG. 2 with multiple stacked layers of machine learning models provides a unique advantage in some embodiments of the present disclosure for the utilization of rare event model.

This architecture in some embodiments of the present disclosure can predict rare events many time steps into the future. This ability to foresee rare event into many steps into the future (1) gives the service layer in FIG. 4 and human administrators sufficient time to react and (2) gives the action recommendation model ability to output predicted actions many steps into the future. On the other hand, if the rare event model can only take in input from actual data such as sensory data in previous time steps up until the immediate previous time step, and a devastating rare event is predicted to happen only one time step away, there will be not enough time for correction or action to be taken to alter the equipment statues to avoid such rare event. In a machine learning architecture that is missing the first layer of models especially the sensory model, or if the sensory model is not a sequence model including time series model, it is impossible to obtain sensory input data many time steps into the future. Then only having actual sensory input and trying to use survival classifier machine learning approach to predict rare event will inevitably run into problem of not able to foresee rare events many steps into the future. In training, if the rare event label is at the immediate next time step, it is obvious that the prediction of rare event based on actual sensory data can only be the next time stamp. In training, if the rare event label is at many time steps later, the rare event model may not be able to capture the significant change in the input sensory data immediately prior to or in a short period of time steps prior to a rare event, thus may be incapable of predicting the rare event many time steps later.

A novelty aspect of applying the survival classifier model approach to the rare equipment event modeling can include that (1) it is applied to a sequence of equipment sensory data, and survival classifier is used to model the immediate next step's rare event. Equipment sensory data regularly are modeled with time series modeling approach and in other persons' designs, the rare event is part of the time series model. That is, treating y_(ek–t) as if it were y_(oj–t). This time series approach on rare events may inevitably run into the imbalanced target data problem without a good solution. With survival classifiers on top of time series, it is possible to eliminate and sample at row level, providing additional tools to deal with imbalanced target data. Other novel aspects may include: (2) usually, survival classifier modeling approach is applied to patient/disease survival data, not hardware equipment data. (3) Novel transformer model specific modeling technique for rare event model will be discussion in section 3.3, which can model even fewer incidences of an event.

Section 2.7. Action Recommendation Models

After the prediction of rare events, hard coded logic or a different machine learning model can be implemented to provide the next action(s). Examples of such scenarios include but not limited to: if a predicted sensory value (temperature, amplification, etc.) exceeds certain threshold, or if a rare event is predicted to happen (e.g., a part of equipment will fail), and then evoke an action (e.g., change that part, add maintenance procedures, add lubricant oil, etc.). Traditional hard coded logic, which are not in the claim of this patent, can only encode relatively simple if then relationships. This patent will skip details of possible traditional hard coded logic but focus on machine learning solutions.

Figure 6:
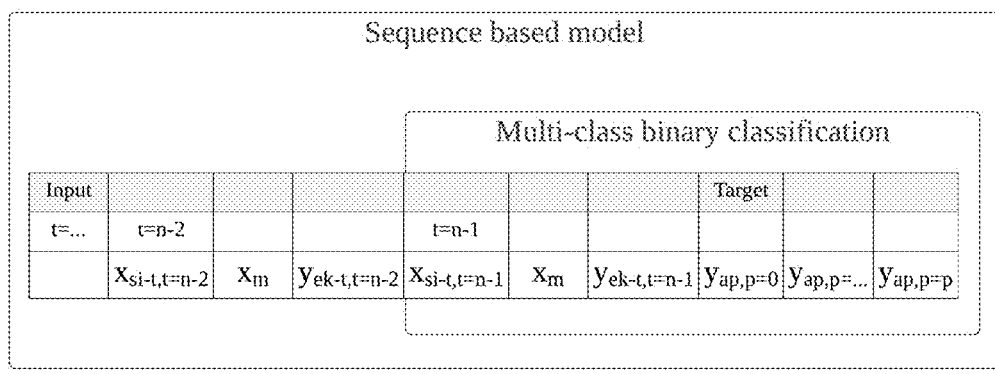
FIG. 6 shows an action recommendation with a recommendation system-based model.

FIG. 6 illustrates the organization of input and target data for action recommendation models. Those skilled in the art, based on the present disclosure, can innovatively apply recommendation system's machine learning modeling technique in a novel way to output predicted actions in manufacturing equipment. There are p available actions y_ap that previously actually took place in the factory. They are the target variables. They only take the value of 0 or 1. All the input of sensory model and all the actual rare event happened in the past are the input to the action recommendation models. The choice of the actual machine learning modeling technique is flexible. In this application scenario, the p available actions can be modeled by any multi-class binary classification models, such as tree-based models and logistic regression models, many multi-layer perceptron based deep learning models pervasive in the online ads industry (such as DIN, Wide&Deep, FNN, DeepFM, AFM, NFM, FM, etc.) (Wang 2020), or sequence based deep learning models such as LSTM (Pan, Sheng et al. 2019), etc. After a numerical value for a specific action is assigned by a multi-class binary classification model, the strategy to actually accomplish the predicted action is flexible. For example, for actions to prevent critical failures, the preventative strategy can be over-engineered. For actions of routine maintenance, the strategy can be optimized with cost effectiveness and resources constraint.

Figure 7:
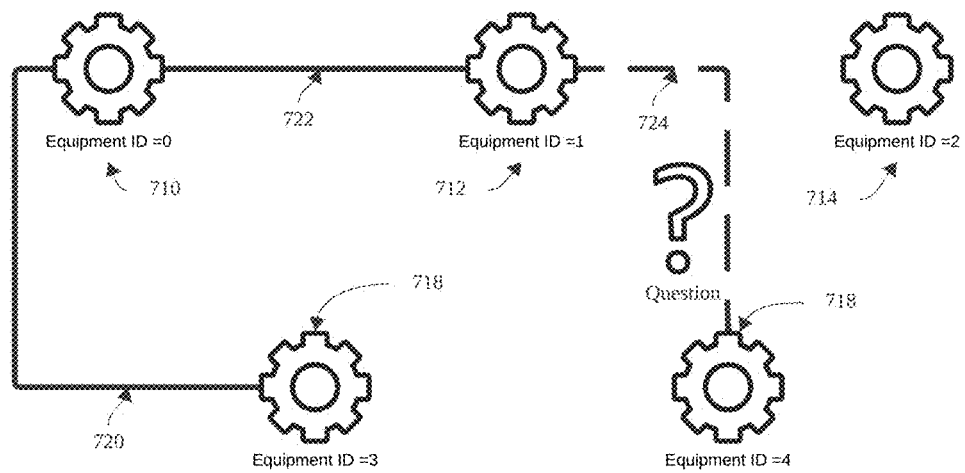
FIG. 7 shows an action recommendation with a graph link formation prediction.

Alternatively, persons skilled in the art can also view this problem as a graph modeling problem, and use deep learning on graph (Zhang, Cui et al. 2020). The pieces of equipment are nodes. Actions of the same type (e.g., oil change maintenance) actually performed by the same entities (e.g., one maintenance expert) on different pieces of equipment form edges. The input to the multi-class binary classification models described in the previous paragraph, in addition to those described in FIG. 6, can alternatively be embeddings of the nodes from a graph modeling's point of view. In the present disclosure, an embedding refers to one vector from the output of the process of creating vectors using deep learning. Persons skilled in the art can compress the time dimension in the graph, i.e., only build a small number of graphs compared to a big number of time steps in the data and each graph does not change with time in relation to the next graph. Or alternatively, persons skilled in the art can build a graph that changes with time, i.e., a time-dependent graph. Although each snap shot of the graph could contain aggregated information from multiple time steps, there is an assumed relationship among snap shots of the graph on the time axis. Instead of predicting node classification, in this application scenario link formation (DGL_Team 2018) can be predicted, as shown in FIG. 7. There are pieces of equipment 710, 712, . . . , 718. In a time dimension compressed graph or a snap shot of a time dependent graph, it is known that equipment 710 and 718 formed a link 720 because they had the same action previously done. So does link 722 between equipment 710 and 712. There is no link linking to equipment 714. Now if a new equipment 718 is predicted to form a link to any of the existing linked equipment 710, 712, 714, then equipment 718 is predicted to have the same action that formed the link.

A novel aspect of some embodiments of the present disclosure can be that this graph link formation prediction approach has not been applied to the maintenance and failure prevention problem for hardware equipment. Usually, graph is used for drug discovery, social network, web page link, etc.

After so many supervised modeling techniques that output predicted actions, one can even add an ensemble layer to see which action get the majority vote from so many models. More variations and implementations can be provided after the introduction of transformer in the section on EquiFormer, and applying transformer specific modeling technique to provide actions in section 3.4.

Section 2.8. Comparison with Lookout for Equipment Service

A "lookout-for-equipment" function in some implementations is a service to warn equipment failure. A modeling part can be provided with online model refresh and service. On the machine learning model side, after future time sensory values are predicted, typically only statistical tests are employed to see if the predicted future sensor value is statistically significantly different from past time sensor values. If it is, alerts will be issued.

A machine learning service according to some embodiments of the present disclosure differs from other "lookout for equipment" functions in a number of ways.

For example, in some embodiments of the present disclosure, a very flexible machine learning technique can be selected for sensory model. The transformer architecture for sensory model in manufacturing data has not been envisioned before, and section 3 of the present disclosure further describes new applications and methodology of how to apply transformer-based technologies to manufacturing time series data.

In another example, the rare event alert in some embodiments of the present disclosure is determined by machine learning model in layer 2, not statistical test.

In yet another example, some embodiments of the present disclosure provide additional optimization models, and action recommendation models that are nonexistent in other implementations.

On the hardware side, a cloud service may lack specific IoT hardware design in the lookout equipment service.

In the following, it is further described what chips/components needs to be added to a specific hardware, optical programming processor, in order for the IoT machine learning service to work.

Specifically, to send abnormality alert, some other implementations use severity score and other scores, which is a statistical test-based approach (for example, when a new value comes in, a one sample test to determine if it belongs to a normal population is performed). Those implementations may declare that labeling abnormality can improve its alert accuracy, which does not mean that it uses the same machine learning modeling approach as that disclosed in some embodiments of the present disclosure. It might use other statistical tests as well (for example, when a new value comes in, a two-sample test to determine whether it belongs to a normal population or an abnormal population is performed).

Some embodiments of the present disclosure utilize machine learning modeling approach, and provides a novel large transformer model based solution in section 3 for this particular problem, and simultaneously, the normal behaviors of a group of hardware equipment with similar but different specifications, not of just one isolated equipment, are also considered in the solution provided here.

After an abnormality is detected, other types of services may not provide machine learning solution at all. User provide their own downstream action, either by manually adding action once an abnormality is detected in lambda function (such as sending SMS to a phone number) or users build their own machine learning model. The present disclosure provides a machine learning modeling solution for the actions that should be taken automatically after an abnormality is detected.

Section 3. EquiFormer: A Specific Implementation of Transformers on Hardware Equipment Section 3.1. Transformer as an Embedding and Foundation Model Transformer based model has been modeling sequences in text, image, and recently in time series (specifically finance, such as stock price, and retails), and may have never been applied to hardware equipment data and control. Because sensory models and optimization models in the present disclosure are time series, the present disclosure can apply such powerful transformer model to the hardware equipment modeling problem. The innovation is that transformer may have not been used in this hardware equipment included system according to some embodiments of the present disclosure, especially for manufacturing data. Many of the embedding method, fine tuning, application to rare event modeling will for the first time be modified to solve hardware equipment data and or manufacturing problems which were hard to be solved with traditional methods and even with methods described in section 2 of the present disclosure. Section 3 further describes the novel transformer implementation in some embodiments of the present disclosure.

Figure 8:
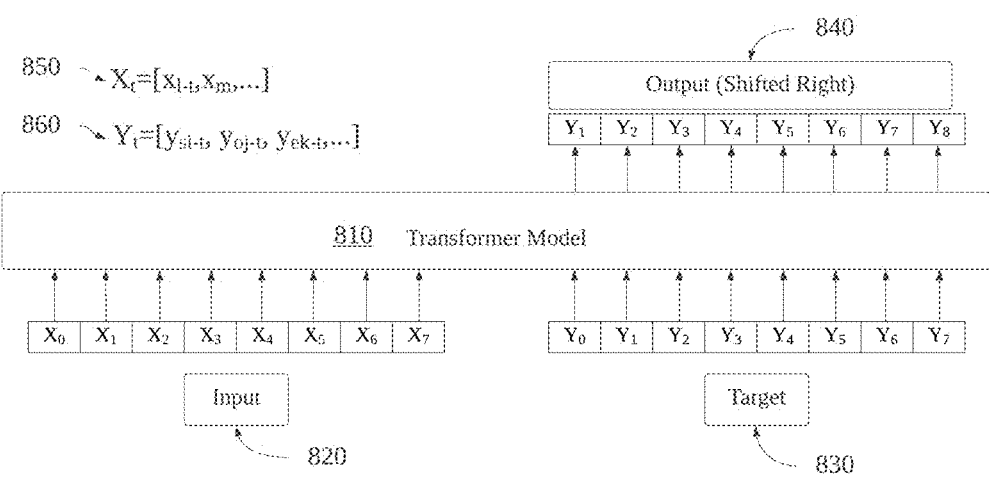
FIG. 8 shows a transformer-based hardware optimization model architecture.

FIG. 8 illustrates the modeling architecture of the transformer-based foundation model for manufacturing hardware modeling. (1) In FIG. 8, it shows window size of 8, for illustration purposes, for time steps in both input 820 and output 830. The window size is flexible in the present disclosure. Please note that in transformer, the position step is slightly different from time step, but for simplification purpose, the existing subscript t can be used to represent position step. As in transformer, the position step is the step in the window size, and as window moves on time series data, the position step is still 0 to 7 in the case of a window size of 8, but the actual time step that is in X_t changes accordingly as window moves. That is, if a time series time steps are from 0 to 11, and the window size of transformer is 8: the first row of data in transformer's window consists of time steps from 0 to 7, the second row of data in transformer's window consist of time steps from 1 to 8. (2) The architecture inside the transformer is also flexible, for example, the number of layers, the position of the layer-Norm, etc. (3) The Input data, X_t 850, is a vector/embedding of relevant and important input variables at its position (in this case a time step in the time series). The exact order, choice and embedding of input variables that assemble X_t is flexible. (4) The target data, Y_t 860, is a vector/embedding of relevant and important target variables at its position. The exact order, choice and embedding of target variables that assemble Y_t is flexible. In FIG. 8 for the illustration purpose, sensory information, y_(si–t), is regarded as part of target. However, given the flexibility of the transformer model's target vector, if the sensory model is not part of the use case, y_(si–t), can be part of the input vector, and target vector can remove its y_(si–t) component. (5) Output, 840, is the predicted target shifted one step to the right.

This architecture will call the transformer model an embedding model because as a deep learning model, the output of last layer, before the output of the target, is a vector, which serves as an embedding for that window beginning at a specific position. This architecture will also call the transformer model a foundational model because: (1) the transformer is capable, as many deep learning models, of modelling multiple labels in the target. The foundation model fuses models that have a time series component in FIG. 1, which includes the sensory model, the optimization model, the rare event model, and possibly the action recommendation model, into a unified modeling structure. In the case that the transformer model is used for the purpose of predicting sensory data and optimization goal targets, regardless of whether the target in training also includes rare event or action recommendation target, it can be referred back to Section 2.6 for downstream rare event and action recommendation with non-transformer-based methods. (2) it enables downstream application scenario of rare event prediction and action evocation with transformer-based methods. It is the foundation of all the downstream application scenarios.

The embedding of input and target are unique in some embodiments of the present disclosure. (1) In transformer models used in the large language models (LLMs), the input and target are both embedding for words. In some embodiments of the present disclosure, Y first can be a different category of variable from X. For example, when X is comprised of a vector of sensory data, Y can be comprised of a vector of optimization goals. (2) Y can take many forms and embedding. This flexibility in Y in some embodiments of the present disclosure, as opposed to the application scenarios in LLMs, gives a unique benefit of allowing the application of multi modal methods into EquiFormer's application scenarios. Transformer has a unique new research direction on fusion of multi modal, in which the current researches focus on the targets comprised of a mixture of text and images/videos (Gal, Alaluf et al. 2022). EquiFormer's target are unique to existing multi modal researches: they are sensory data, optimization goals, rare events and actions. (3) Furthermore, if some of the sensory data can be transformed into images, EquiFormer has the flexibility of taking different forms of data as input/target of the transformer model. On one hand, Equiformer can use sensory data in its parameter form. One the other hand, EquiFormer can take a snap shot of the image, embed the image into convolutional neural networks (CNN), and then use the embedding from CNN either as input or target of sensory data. Such examples of data can be sound wave, light wave, particle imaging, quantum state tomography, etc. In the example of light wave, the parameter form can be amplitude, frequency, etc., of each component waves, and the CNN embedding form can be a vector of the light wave's image's CNN embedding.

Compared with some multi-modal researches, some embodiments of the present disclosure innovatively can add a CNN component to transform non-image input/target to image input/target from manufacturing equipment data.

Section 3.2. Optimization and its Control

In some embodiments of the present disclosure, an application scenario of EquiFormer is hardware optimization and control, optimization can refer to an optimal input for manufacturing optimization goal, and control can refer to adjusting the randomness in the input to the optimal input calculated from the optimization model.

There are several solutions to solve the optimization problem with the transformer model.

(1) One can use method described in section 2.4: replacing other models with the transformer model described in section 2.4, varying hardware input to generate predicted optimization goal target values at future steps, and using predicted input values as input for optimization target when input values are not available at future steps. When the search space is large, one can see that this method is tedious.

Figure 9:
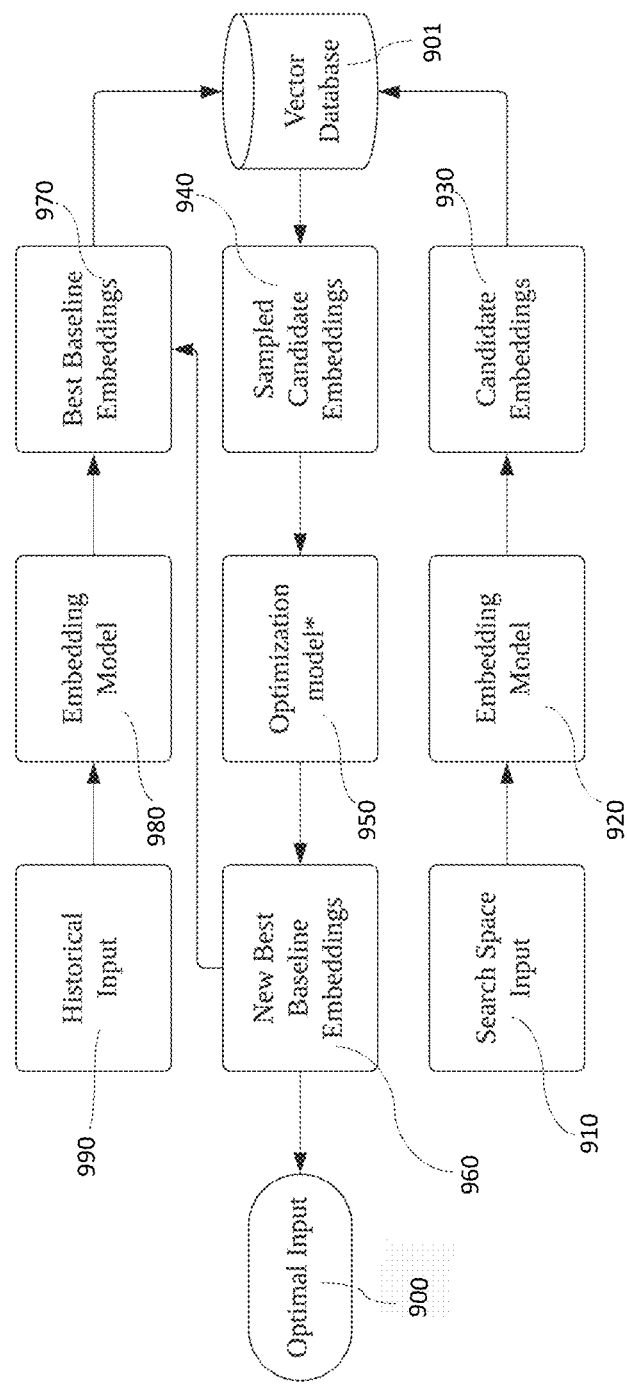
FIG. 9 shows a transformer embedding retrieval-based hardware input optimization.

(2) Another innovation specific to transformer model is to leverage the transformer embedding. FIG. 9 shows a simplified flow chart to explain this process, which can be named as an EquiFormer based retrieval optimization in some embodiments of the present disclosure. Note that the embedding model can be the same or different from the optimization transformer model. However, both models need to be transformer models. When the embedding transformer model is different from the optimization transformer model, the target in the embedding transformer model can be different from the target in the optimization transformation model. In the present disclosure, it is assumed that the current optimization goal in the target for the optimization transformation model is the same as that when the optimization transformer is trained.

(2.1) In a given search space 910, those skilled in the art can use any methods (grid search, random search, or SMBO) in section 2.5 or beyond to generate input combinations. Then instead of actually generating target values from the transformer model, persons skilled in the art can generate embedding vectors from the embedding transformer model 920. Hereafter, those embedding vectors can be referred to as 'candidate embeddings' 930. The reason to generate embedding instead of target is that maybe persons skilled in the art need the embedding vs. target to reside in different systems (e.g., online equipment vs offline vector database 901), or maybe persons skilled in the art need to use the embedding from transformers trained in one set of target values to fine tune into a different set of target values, such as changed optimization goal. Plus, one less step in the transformer calculation (from embedding to target) may save a little bit of computation power.

(2.2) In the existing historical input 990, the input variable vectors can be feed into the embedding transformer model 980, to get embedding vectors. Hereafter, those embedding vectors can be referred to as 'baseline embeddings.' Note that the embedding transformer model, 980 and 920, is the same embedding transformer model. Note again that the optimization transformer model, 950, can be the same or different from the embedding transformer model. The only one "best" baseline embedding 970, is defined as the one vector from the baseline embeddings that generates the best optimization goal value.

(3.3) The distances of candidate embeddings 930 is compared with the best baseline embedding 970 in a vector database 901. A sample of candidate embeddings 940 can be obtained, which have small, medium, or large distance (or whatever sampling strategy one would like use to sample by distance) from the best baseline embedding. This step will dramatically reduce the number of candidate embeddings that need to be fed into the optimization transformer model 950 to evaluate target values. Note that a component of the target value is an optimization goal. In theory the candidate embeddings with the least distance to the best baseline embedding should generate similar target values, and those ones which are far from the best baseline embeddings should generate target values that are different from the base baseline target. The by-distance-sampled candidate embeddings that generates the new best target value become the new best baseline embedding 960.

(3.4) Step (3.3) is repeated and candidate embeddings that have small distance to previous candidate embeddings or baseline embeddings that are already evaluated are removed, to see if a new best candidate embedding can be found to replace the best baseline embedding, until exhaust the search space or reach the iteration limits. The corresponding input to the best candidate embedding is the optimal input to the hardware found.

(3.5) If there are multiple best baseline embeddings, one can either just loop through each of the best baseline embeddings, or use any parallel computing method to parallel the search process.

On the control side, after a set of optimal values for the hardware input is found, for each of the input, there are always randomness in the input value and will always not be exactly what the optimal value is. Then a control value is needed to adjust the randomness of the input value so that the input value will close to the optimal value as possible. In traditional control theory's explicit formulas, the parameter optimization to find the best control value is hard, and the final control value is usually a linear combination of components of control values. In some embodiments of the present disclosure, if the transformer-based foundation model (note that transformer model is not only embedding model, but foundation model for all time series models including sensory model, optimization model, etc.) or other time series models are used, and the target or output contains a component of sensory input data $y\_(si-t)$, then the problem can be solved in a novel numerical approach. For any randomness (change $\Delta$ in input values) added to the previous steps in $y\_(si-t, t<n)$, the future $y\_(si-t, t>=n)$ will be known from transformer model exactly. Transformer model, as a special case of deep learning model, has a property called universal approximation, meaning that it can approximate any explicit mathematical formulas. So that it is not necessary to rely on linear combinations to approximate control values.

Various embodiments of the present disclosure solve a difficult problem faced by traditional control theories, where explicit formulas are employed, that is, users need to know what exact parameters values the explicit formulas should take to approximate future values of input.

According to some embodiments of the present disclosure, it is no longer necessary to know those parameter values to accurately know the future values of input. After the future $y\_(si-t, t>=n)$ are known for each time step, and are compared with the best input value $y\_si^*$ for that $y\_(si-t)$, the control values can be easily computed using any control theory's methods. For example, persons skilled in the art can approximate differentials used in control theory with slopes from the machine learning model's predicted value over time steps, and integrals used in control theory with areas of the machine learning model's predicted value over time steps, and may not need to know what exact the parameter values are in the explicit formulas or what explicit formulas should be. Also, this method can simulate many $y\_(si-t)$, and their interactions are totally taken care of by the foundation model.

The present disclosure not only introduces machine learning models that can be used for time series data, but also provides a system of machine learning architecture for problems (not only the normal sensory data forecasting) in hardware equipment data and how data and machine learning models should be stacking on top of each other for the system to solve hardware equipment problems. Three layers of models are provided, wherein three problems are solved in layer 1. On the hardware optimization problem in layer 1, a novel control solution based on machine learning is also provided. Please also note that this novel control solution is not limited to transformer-based optimization models, but any machine-learning-based optimization models.

Section 3.3. Transformer Specific Rare Event Prediction

Traditional supervised machine learning's rare event prediction in section 2.6 requires at least some rare event that actually happened in the past as label. Accordingly, section 2.6 focuses on the hardware innovation of IoT to collect and share rare event data for model building. An equipment lookout service in some other implementations described in section 2.8 is not predicting rare event per se. It is using statistic test to detect deviance of the sensory data from statistical metrics when the equipment is running normally. The method proposed here is very different from what is known to be zero, one and few shot learning in LLMs. In LLMs, because both the input and output are words, the entire foundation model crystallizes relationship of words, and the learning are based on language-based input and output. In the present disclosure, the input can be different from the target, and the foundation model may have not been subject to human instructions or reinforcement learning from human feedback.

(i) When no rare event (e.g., failure, valued at 0) ever happened: the component of foundation transformer 810's output Y 860, that specific rare event's value, $y\_(ek-t)$, will always be 1 (running normal). However, other components of output Y 860 in the foundation transformer model still varies. The foundation transformer model 810 captures what a normally running hardware system's other target values should change according to input values. When varying input vector predicts $y\_(ek-t)$ that is far less (for example near 0) than actual value of $y\_(ek-t)$ which is 1 exceeding a threshold, or statistically significantly away from a sample of normally running hardware's predicted $y\_(ek-t)$ values, it is an indication of abnormality about the rare event. Probably the never happened rare event will happen at that step. This zero-negative-label learning fundamentally breaks through the supervised learning's curse that something has to happen before to be used as label. In the transformer-based foundation model, the crystallized relationship on a normal running hardware will give at least some indication of a never happened failure, thanks to the flexibility of target in the transformer model. In the present disclosure, there is no semantic component in the foundation model either in the input or output, unlike those in LLM. The inventor of the present disclosure has recognized that the transformer predicted $y\_(ek-t)$ values also form distributions, and the normal running hardware's predicted $y\_(ek-t)$ values form one distribution, and the abnormally running hardware's predicted $y\_(ek-t)$ values does not come from the normal running one's distribution. The predicted values of $y\_(ek\_t)$ from normal vs non-normal running hardware form two distinct distributions. A statistical test of examining whether a predicted value of $y\_(ek\_t)$ comes from a normal running hardware's distribution is a theoretical basis for some embodiments of the present disclosure to predict rare event when it has not happened before. Once the predicted $y\_(ek-t)$ values came out of the foundation transformer model, the exact methods to determine there will be a rare event to happen can be flexible, and not limited to the threshold or statistical test mentioned here.

In contrast, in other implementations, "equipment lookout" does not have a model to predict $y\_(ek-t)$, does not use a transformer model to predict $y\_(ek-t)$, nor does it have a solution as described in the present disclosure for no previous rare event ever happened.

Figure 10:
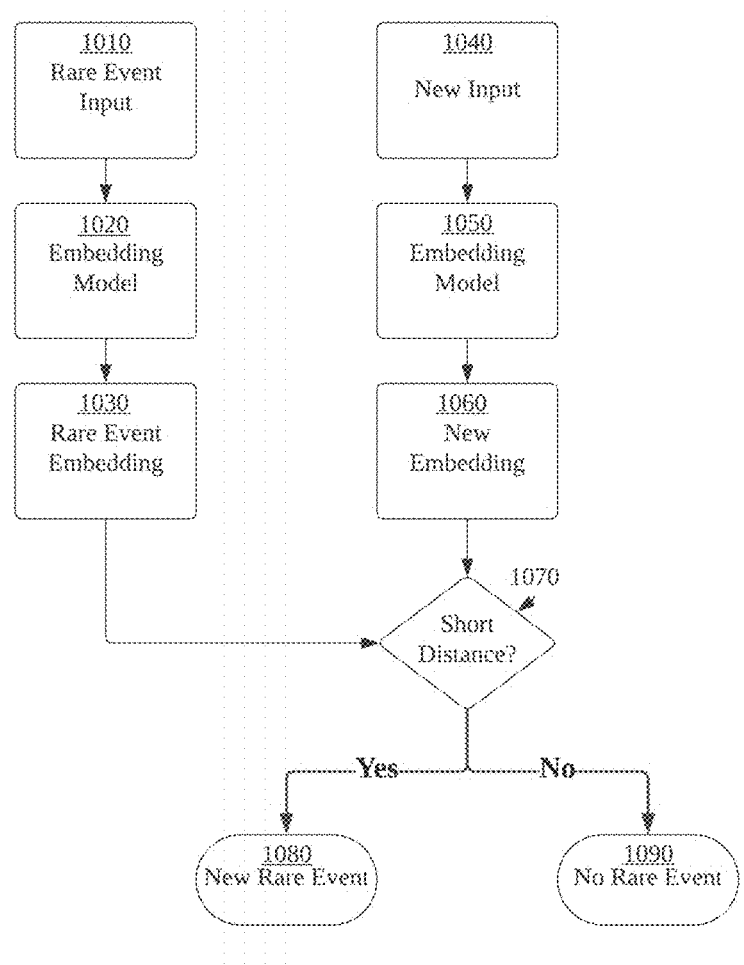
FIG. 10 shows an embedding based approach to predict rare event happened only once.

(ii) When there is at least one rare event: in this case, that special rare event has already been crystallized in the transformer-based foundation model. (ii.a) Firstly, even if only the method in (i) is used, it should give us better indication than (i) when there is no rare event ever happened. (ii.b) Secondly, since there is at least one rare event, the embedding approach can be used. FIG. 10 illustrates this embedding-based rare event prediction based on rare event only happened once. The input when the rare event 1010 happened, an embedding of that particular step's input embedding vector 1030 can be obtained through the transformer model 1020. When new other input value 1040 yields a new embedding 1060 through transformer model 1050 that is of very short distance from the rare event's embedding, that is an indication of other rare events will happen. The decision mechanism 1070 to decide how short the distance is short can be flexible, for example, using threshold, statistical test or other methods.

(iii) When there are few rare events happened: this patent provides a method to do data level augmentation such as up-sampling of rare events, or transformer parameter tuning based approach for the model to better capture the relationship between input and rare events. Methods in the above two approaches are not limiting of the present disclosure.

Section 3.4. Transformer Specific Action Evoking for Hardware

Various embodiments of the present disclosure provide novel applications of multi modal approach, and action evaluation approach to the action evoking problem for hardware.

The first approach leverages the multi modal capacity of the transformer model. Previously multi modal had been applied to images and texts. If specific actions being coded as 0 or 1 form a vector, the vector can be used as an input or target. Some embodiments of the present disclosure suggest that the action vector can be mixed with sensory and other data to form a multi modal transformer model. Equi-Former's innovation is that multi modal transformer can be applied to manufacturing hardware problems, and it suggests possible new target vector.

The second approach is the action evaluation. In previous LLM use cases, transformer can generate actions such as revoke a calculator/sql snippet (Fu, Ou et al. 2022). The action evaluation uses python or SQL snippets, or mathematical formulas, where the generated semantic sequence can be fed into a python interpreter or SQL engine to see if it runs or into a calculator to see if it calculates. Of course, it is necessary to have methods to decide when to generate those snippets or formulas in a natural conversation and decide what is the beginning and end of the generated texts that needs to be evaluated as an action. Those LLM problems are still very different from the hardware action evoking in this patent. Because there is no python interpreter or sql engine or calculator in some embodiments of the present disclosure, various embodiments of the present disclosure add task specific models to replace those evaluators in the LLM literature.

In a common practice of maintenance actions for hardware, the manufacturer usually will propose some scheduling (when a car has run x miles, it needs to change oil) or rules (when the x alarm light is flashing, the x component needs to be replaced). The scheduling is based on time steps, and the alarm light is based on sensory data. Thus, all of them are known in the transformer model. One can have simple rule-based evaluator just like the current industry does, or persons skilled in the art can make additional models based on the input of time steps and sensory data, with human labels of which action should be done (1) or not be done (0).

In some embodiments of the present disclosure, the transformer generated actions can be evaluated by human, and then be used in reinforcement learning.

Section 4. EquiFormer for Optical Programming Processor

The predecessor of optical programming processor is called optical programmed processor, or in some even earlier patents called Adaptive Climate Controller (ACC) which is an earlier name for optical programmed processor.

The equivalency between ACC and optical programmed processor can be confirmed in some implementations. Optical programmed processor is described in a group of 17 references listed below. It uses light wave control, instead of electronic control, to output optimal electric motor parameters. OPP converts the modulating real time electromagnetic data (light) directly into electric signals (digital or analog) which can be directly amplified without added conversion to hi-power for direct use by the analogue motor which converts analog electric power to analog electric motion. Through the control, it increases the motor's energy efficiency, which is usually measured as a % ratio of the output mechanic power divided by the input electric power. In this predecessor, the parameters in the optical component, such as a frequency of each light source, to control the energy efficiency of electric motor is predetermined in the lab by physical experiment before manufacturing the optical programmed processor. Once determined, those parameters are hard written into the processor and will never be changed throughout the life time of the processor. In this old processor, the optimization goal is usually a static output variable such as torque that does not change with time but changes with the predetermined parameters. In some practical applications, it does change with time. That is why when the optimal programmed processor is added to the motor, a varying range of energy efficiency will be observed from real time data.

Figure 11:
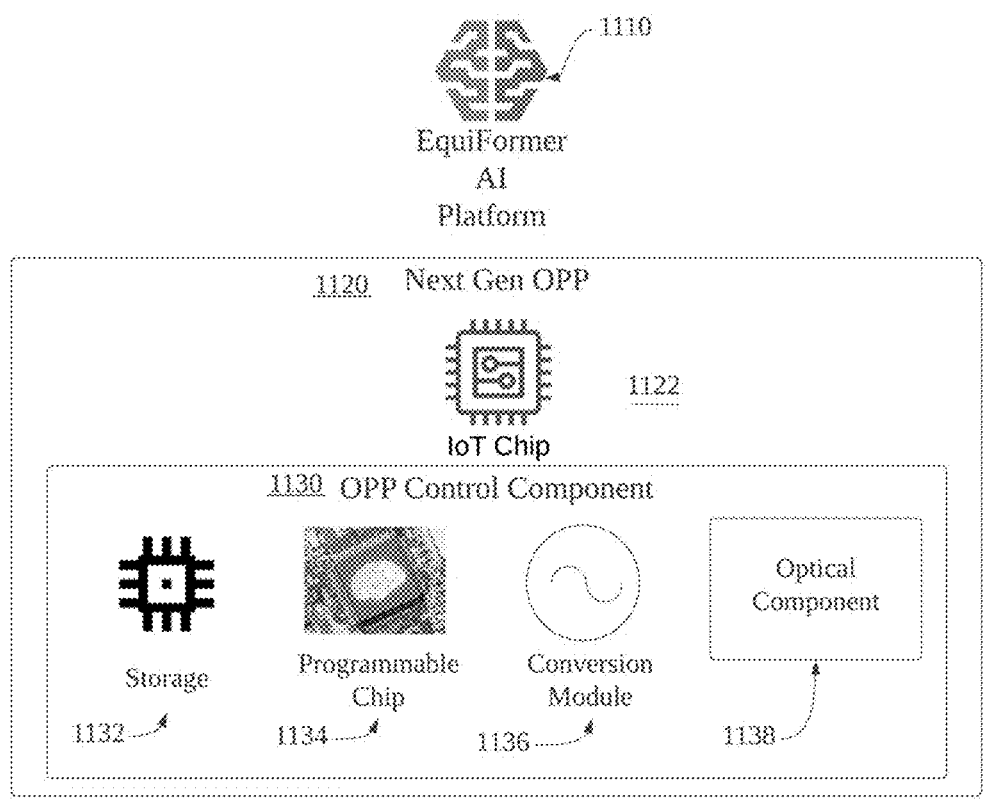
FIG. 11 illustrates a conceptual diagram of the hardware components of the next gen OPP, but not specific exact electrical diagram.

In some embodiments of the present disclosure, the next gen upgraded optical programming processor (OPP) has the following innovations as shown in FIG. 11:

(1) It will use AI/machine learning system 1110 as described in either general systems in section 2 or specifically transformer-based system in section 3 to find the optimal hardware parameters which OPP will control, instead of using lab tests only. First generation optical programmed processor has no AI component at all. The specific machine learning model stacking on top of EquiFormer can be described as follows. First step, it can model optical and motor parameters as input, and torque as output, without time component, to accelerate initial parameter optimization. Then it may use EquiFormer for online optimization. The output from first model can be an input for EquiFormer. The control values are also derived from AI/machine learning system as described in Section 3.2. In fact, the optimization goals for the hardware which OPP controls are not limited to electric motor energy efficiency. It can be anything that can be controlled by light waves.

(2) Next generation OPP 1120 will add several hardware components to enable the hardware to talk to AI described in (1). Because now the parameters can be updated, some embodiments of the present disclosure can change the processor name from programmed (one time pre-written) to programming (continuously or intermittently online or offline update).

(2.1) a communication component such as IoT chips 1122 to real time transmit (both ways) the light-based controller's parameters to the data collection service/online optimization service; the exact implement of the communication component can be flexible and not limited to IoT chips.

(2.2) The rest of the hardware components are grouped as OPP control component 1130.

(2.2.1) a re-writable storage component to store the new parameters 1132;

(2.2.2) a programmable chip to read the stored new parameter and change the processor's parameter 1134; and (2.2.3) an optical and electrical signal conversion module 1136 to convert the model parameter in the form of electric signal to light wave.

Then next generation OPP will include the optical component 1138 like the first-generation OPP.

Figure 12:
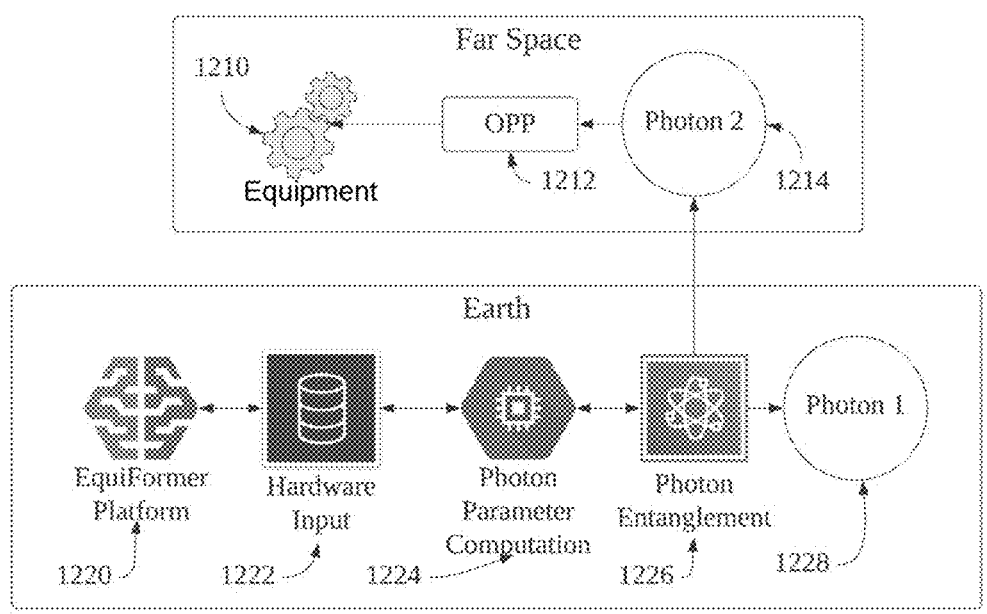
FIG. 12 shows a photon entanglement-based OPP control system.

In (2.1.), use of IoT assumes using internet signal from earth or from satellites. When there is no internet available due to extremely long distance to get an internet signal, such as in a far space, some embodiments of the present disclosure provide another innovative way to control the optical component on earth. OPP has a unique advantage over electronic (digital or analogue) control. OPP uses light waves, not analog or digital electronic signals, for control. Light has wave-particle duality, a property that larger particles are harder to observe. Based on this property, photons have demonstrated being able to enter into quantum entanglements. Then the photons in the quantum entanglement may be capable communicate with each other over long distances. Based on these facts, some embodiments of this disclosure innovatively propose a new photon entanglement-based OPP control system to unilaterally control equipment from earth to remote space as shown in FIG. 12. This disclosure has not yet figured out a mechanism to let the equipment far from earth to talk back to earth, pending innovations from quantum communication. This disclosure at least proposes that if bilateral quantum communication is possible in the far space, then the equipment in the far space can send information back to earth. On earth, the EquiFormer platform 1220 outputs the optimal hardware input 1222 (for optimization and control) for equipment in the far space. Then another computation platform 1224 based on the input for hardware, outputs the parameters of photons that will be used for controlling equipment far from earth. Then a photon entanglement system 1226 produces entangled photons according to those parameters. One photon or multiple photons (referred to as photon 1 1228) for simplicity, can stay on earth for monitoring or other purposes, the other photon or multiple photons, (referred to as photon 2 1214 for simplicity), can be sent to far space along with its accompanying OPP 1212. OPP use Photon 2 to generate light wave that is needed to control equipment 1210 in the far space. The exact implementation of this system can be flexible and extendable. However, it can be emphasized that even without internet, unilateral control of equipment in a far space can be achieved with photon entanglement devices plus OPP in the system.

REFERENCES

U.S. D962,867 S, 2022 Sep. 6, Title: Inductor
U.S. Pat. No. 10,808,961 B2, 2020 Oct. 20, Title: Energy Saving Controller
US 2019/0257539 A1, 2019 Aug. 22, Title: Realtime, Verified and Automated Demand Response Energy Saving Controller
US 2019/0128548 A1, 2019 May 2, Title: Energy Saving Controller
U.S. Pat. No. 10,174,966 B2, 2019 Jan. 8, Title: Energy Saving Controller
U.S. Pat. No. 10,119,719 B2, 2018 Nov. 6, Title: Energy Saving Controller
U.S. Pat. No. 10,066,849 B2, 2018 Sep. 4, Title: Energy Saving Controller
U.S. Pat. No. 10,047,969 B2, 2018 Aug. 14, Title: Energy Saving Controller
US 2018/0038611 A1, 2018 Feb. 8, Title: Energy Saving Controller
US 2017/0051936 A1, 2017 Feb. 23, Title: Energy Saving Controller
U.S. Pat. No. 9,419,543 B2, 2016 Aug. 16, Title: Controlled Resonance in Electrical Power Devices
U.S. Pat. No. 9,410,713 B2, 2016 Aug. 9, Title: HVAC Fan Controller
US 2016/0223219 A1, 2016 Aug. 4, Title: Energy Saving Controller
US 2015/0159905 A1, 2015 Jun. 11, Title: Energy Saving Controller
US 2015/0060557 A1, 2015 Mar. 5, Title: Energy Saving Apparatus, System and Method
U.S. Pat. No. 6,498,546 B1, 2002 Dec. 24, Title: Utilization of Proximity Effect in Ripple Noise Filtering
U.S. Pat. No. 6,329,726 B1, 2001 Dec. 11, Title: Proportional Distribution of Power from a Plurality of Power Sources.
Liukis, A. (2020). "Approaching Time-Series with a Tree-based Model." from https://towardsdatascience.com/approaching-time-series-with-a-tree-based-model-87c6d1fb6603.
Vaswani, A., et al. (2017). "Attention is all you need." Advances in neural information processing systems 30.
Akiba, T., et al. (2019). Optuna: A next-generation hyperparameter optimization framework. Proceedings of the 25th ACM SIGKDD international conference on knowledge discovery & data mining.
Bergstra, J., et al. (2013). Making a science of model search: Hyperparameter optimization in hundreds of dimensions for vision architectures. International conference on machine learning, PMLR.
Wang, J. (2020). Deep Learning Recommender System, Publishing House of Electronics Industry.
Pan, J., et al. (2019). "Order matters at fanatics recommending sequentially ordered products by LSTM embedded with Word2Vec." arXiv preprint arXiv: 1911.09818.
Zhang, Z., et al. (2020). "Deep learning on graphs: A survey." IEEE Transactions on Knowledge and Data Engineering 34 (1): 249-270.
DGL_Team (2018). "Link Prediction using Graph Neural Networks."
Fu, Y., et al. (2022). "MIGA: A Unified Multi-task Generation Framework for Conversational Text-to-SQL." arXiv preprint arXiv: 2212.09278.
Gal, R., et al. (2022). "An image is worth one word: Personalizing text-to-image generation using textual inversion." arXiv preprint arXiv: 2208.01618.

All references cited in the present disclosure are incorporated by reference in their entirety.

For the convenience of description, the components of the apparatus may be divided into various modules or units according to functions which may be separately described. Certainly, when various embodiments of the present disclosure are carried out, the functions of these modules or units can be achieved utilizing one or more equivalent units of hardware or software as will be recognized by those having skill in the art.

The various device components, units, blocks, or portions may have modular configurations, or are composed of discrete components, but nonetheless can be referred to as "modules" in general. In other words, the "components," "modules" or "units" referred to herein may or may not be in modular forms.

Persons skilled in the art should understand that the embodiments of the present disclosure can be provided for a method, system, or computer program product. Thus, various embodiments of the present disclosure can be in form of all-hardware embodiments, all-software embodiments, or a mix of hardware-software embodiments. Moreover, various embodiments of the present disclosure can be in form of a computer program product implemented on one or more computer-applicable memory media (including, but not limited to, disk memory, CD-ROM, optical disk, etc.) containing computer-applicable procedure codes therein.

Various embodiments of the present disclosure are described with reference to the flow diagrams and/or block diagrams of the method, apparatus (system), and computer program product of the embodiments of the present disclosure. It should be understood that computer program instructions realize each flow and/or block in the flow diagrams and/or block diagrams as well as a combination of the flows and/or blocks in the flow diagrams and/or block diagrams. These computer program instructions can be provided to a processor of a general-purpose computer, a special-purpose computer, an embedded memory, or other programmable data processing apparatuses to generate a machine, such that the instructions executed by the processor of the computer or other programmable data processing apparatuses generate a device for performing functions specified in one or more flows of the flow diagrams and/or one or more blocks of the block diagrams.

These computer program instructions can also be stored in a computer-readable memory, such as a non-transitory computer-readable storage medium. The instructions can guide the computer or other programmable data processing apparatuses to operate in a specified manner, such that the instructions stored in the computer-readable memory generate an article of manufacture including an instruction device. The instruction device performs functions specified in one or more flows of the flow diagrams and/or one or more blocks of the block diagrams.

These computer program instructions may also be loaded on the computer or other programmable data processing apparatuses to execute a series of operations and steps on the computer or other programmable data processing apparatuses, such that the instructions executed on the computer or other programmable data processing apparatuses provide steps for performing functions specified ill one or more flows of the flow diagrams and/or one or more blocks of the block diagrams.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

Processors suitable for the execution of a computer program such as the instructions described above include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The processor or processing circuit can be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, general processors, or other electronic components, so as to perform the above image capturing method.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In some implementations, the model can reside on local processing circuits and storage devices, and the training of the model can also be performed locally. In some implementations, the model and the training can be remotely or distributed, such as in a cloud.

Data, such as the inputs, the outputs, and model predictions, can be presented to users/operators on display screens, such as organic light-emitting diode (OLED) displays screens and liquid-crystal display (LCD) screens located on a manufacturing line and/or in a control room.

Although preferred embodiments of the present disclosure have been described, persons skilled in the art can alter and modify these embodiments once they know the fundamental inventive concept. Therefore, the attached claims should be construed to include the preferred embodiments and all the alternations and modifications that fall into the extent of the present disclosure.

The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

In the foregoing method embodiments, for the sake of simplified descriptions, the various steps are expressed as a series of action combinations. However, those of ordinary skill in the art will understand that the present disclosure is not limited by the particular sequence of steps as described herein.

According to some other embodiments of the present disclosure, some steps can be performed in other orders, or simultaneously, omitted, or added to other sequences, as appropriate.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

In addition, those of ordinary skill in the art will also understand that the embodiments described in the specification are just some of the embodiments, and the involved actions and portions are not all exclusively required, but will be recognized by those having skill in the art whether the functions of the various embodiments are required for a specific application thereof.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), terminal(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or terminal, etc. is employed, or it is expressly stated that a plurality of devices, or terminals, etc. are employed, the device(s), terminal(s), etc. can be singular, or plural.

Based on various embodiments of the present disclosure, the disclosed apparatuses, devices, and methods can be implemented in other manners. For example, the abovementioned terminals devices are only of illustrative purposes, and other types of terminals and devices can employ the methods disclosed herein.

Dividing the terminal or device into different "portions," "regions" "or "components" merely reflect various logical functions according to some embodiments, and actual implementations can have other divisions of "portions," "regions," or "components" realizing similar functions as described above, or without divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in the one or more devices described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The numbering of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

What is claimed is:

1. A method for controlling hardware, comprising:
   obtaining equipment sensor data from a plurality of sensors in a first time series;
   obtaining equipment optimization goal data from a plurality of optimization goals in a second time series;
   obtaining historical data on equipment abnormal events and intervention actions;
   obtaining static equipment input parameters;
   applying time series models to the obtained equipment sensor data, the historical data on equipment abnormal events and intervention actions, and the static equipment input parameters, to obtain predicted equipment sensor data, predicted optimization goal values, and predicted rare events; and providing predicted intervention actions for rare event intervention based on: the obtained static equipment input parameters, the obtained equipment sensor data, the obtained equipment optimization goal data, the predicted equipment sensor data, the predicted optimization goal values, and the predicted rare events;

wherein said applying further comprises applying a machine learning architecture including stacking three layers of models on top of the obtained equipment sensor data, the historical data on equipment abnormal events and intervention actions, and the obtained static equipment input parameters;

wherein the three layers of models comprise the predicted equipment sensor data, the predicted optimization goal values, the predicted intervention actions, and the predicted rare events; and wherein said providing comprises sending a control signal based on the predicted actions to a control circuit for controlling the hardware to modify a manufacturing process toward the predicted optimization goal values and to intervene the predicted rare events.

2. The method of claim 1, further comprising:
iterating at least once between said obtaining historical data on equipment abnormal events and intervention actions, said obtaining static equipment input parameters, and said applying the time series models; and
providing the predicted intervention actions to a user based on results from said iterating.

3. The method of claim 2, wherein said providing further comprises displaying the results on at least one of a display screen, providing an Application Programming Interface (API) to control the hardware, or providing a phone alert to the user.

4. The method of claim 1, wherein the time series models comprise a transformer model.

5. The method of claim 4, further comprising outputting, from the time series models, the obtained equipment sensor data $y\_(si-t)$, from i-th sensor, as a function of time t.

6. The method of claim 5, further comprising outputting, from the time series models, the obtained equipment optimization goal data $y\_(oj-t)$, from j-th optimization goal, as a function of the time t.

7. The method of claim 6, wherein the obtained equipment sensor data $y\_(si-t)$ comprise temperature data measured at specified locations.

8. The method of claim 7, wherein the obtained equipment sensor data $y\_(si-t)$ comprise at least one of amplitude, voltage, current, frequency, or force of an electric motor.

9. The method of claim 7, wherein the obtained equipment optimization goal data $y\_(oj-t)$ comprise at least one of energy output, power, torque, or energy efficiency of an electric motor.

10. The method of claim 1, further comprising generating a target value sequence beyond one time stamp ahead, and use the generated target value sequence for models in downstream layers as input when real data are not available.

11. The method of claim 10, further comprising constructing a rare event model in a second layer among the three layers, wherein the rare event model predicts rare events far into the future facilitated by that:
a first layer among the three layers is capable to predict sensory equipment sensor data far into future resulting from that the first layer comprises the predicted equipment sensor data, and the predicted optimization goal values; and
manipulation of rare event data is by rows, enabled by choice of survival classifiers, to overcome the lesser rare event label in a supervised learning concept.

12. The method of claim 11, wherein the rare event model is based on a transformer model that is capable to forecast the rare events.

13. The method of claim 12, wherein the transformer model is configured to forecast the rare events when there is no previous rare event.

14. The method of claim 13, wherein the transformer model is configured to forecast the rare events when there is only one previous rare event.

15. The method of claim 13, wherein the transformer model is configured to forecast the rare events when there are several previous rare events.

16. The method of claim 15, further comprising constructing an action recommendation model configured to output the predicted actions far into the future from the transformer model.

17. The method of claim 16, further comprising:
providing hardware equipment parameter optimization base on the transformer model, wherein the transformer model comprises a foundation model that learns and organizes hardware equipment data from a plurality of use cases and types of equipment and a plurality of input and output data types and sources; and
providing an EquiFormer system design based on a network of connected equipment including remotely configurable and programmable optical programming processors with configurable parameters from both the equipment sensor data and the machine learning architecture.

18. The method of claim 17, wherein when the network is offline, the method further comprises:
sending the configurable parameters based on photon entanglement unilaterally from the machine learning architecture to the optical programming processors.

19. The method of claim 18, wherein the photon entanglement spans a distance from earth to space.

20. The method of claim 17, wherein:
the remotely configurable and programmable optical programming processors comprise a communication component, and a control component with rewritable storage of new parameters and programmable chips for programming control, and a signal converting component configured to convert model parameters into light signals,
wherein when the network is available, the communication component is configured to have a two-way communication with the machine learning architecture to reconfigure the configurable parameters.

* * * * *